US012801702B2

(12) United States Patent
Inagaki

(10) Patent No.: US 12,801,702 B2
(45) Date of Patent: Nov. 17, 2026

(54) DISTRIBUTION MANAGEMENT SYSTEM, SERVER SYSTEM, TERMINAL DEVICE, AND DISTRIBUTION MANAGEMENT METHOD

(71) Applicant: BANDAI NAMCO Entertainment Inc., Tokyo (JP)

(72) Inventor: Hirofumi Inagaki, Tokyo (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 110 days.

(21) Appl. No.: 18/852,274

(22) PCT Filed: Jan. 19, 2023

(86) PCT No.: PCT/JP2023/001485
§ 371 (c)(1),
(2) Date: Sep. 27, 2024

(87) PCT Pub. No.: WO2023/188717
PCT Pub. Date: Oct. 5, 2023

(65) Prior Publication Data

US 2025/0209142 A1 Jun. 26, 2025

(30) Foreign Application Priority Data

Mar. 29, 2022 (JP) ................................. 2022-053550

(51) Int. Cl.
*G06F 21/00* (2013.01)
*G06F 21/10* (2013.01)
(Continued)

(52) U.S. Cl.
CPC .......... *G06F 21/108* (2023.08); *G06F 21/107* (2023.08); *G06Q 20/4014* (2013.01); *G06Q 30/018* (2013.01); *G06Q 30/0283* (2013.01)

(58) Field of Classification Search
CPC . G06F 21/108; G06F 21/107; G06Q 20/4014; G06Q 30/018; G06Q 30/0283;
(Continued)

(56) References Cited

U.S. PATENT DOCUMENTS 7,007,166 B1 * 2/2006 Moskowitz ........... G06T 1/0021 713/168
7,664,834 B2 * 2/2010 Keith, Jr. ................ H04L 67/34 713/2
(Continued)

FOREIGN PATENT DOCUMENTS

JP 2008-165625 A 7/2008
JP 6087469 B1 3/2017
(Continued)

OTHER PUBLICATIONS

International Search Report of the International Searching Authority mailed Apr. 11, 2023 in the corresponding International Patent Application No. PCT/JP2023/001485 (and English translation).

*Primary Examiner* — Mahfuzur Rahman
(74) *Attorney, Agent, or Firm* — Posz Law Group, PLC

(57) ABSTRACT

The distribution management server that is configured to: manage license information of an original product that inheres in a customized item, and user information of an item user who utilizes the customized item; and perform a transfer-related process. The transfer-related process includes: a transfer detection process of detecting the transfer of the license of the customized item from a transfer request user to a transfer destination user; a value setting process of setting the value of the original product that inheres in the customized item in the case where the license is transferred; and a license information update process of updating the license information and the user information of the customized item which is a target of the transfer when
(Continued)

detecting the license is transferred from the transfer request user to the transfer destination user.

6 Claims, 12 Drawing Sheets

(51) Int. Cl.

| | |
|---|---|
| ***G06Q 20/40*** | (2012.01) |
| ***G06Q 30/018*** | (2023.01) |
| ***G06Q 30/0283*** | (2023.01) |

(58) Field of Classification Search

CPC ............. G06Q 20/065; G06Q 20/1235; G06Q 20/38215; G06Q 20/389; G06Q 30/06; G06Q 50/10; G06Q 50/18; A63F 13/33; A63F 13/35; A63F 13/79; A63F 13/792; A63F 13/85; G07F 17/3281

See application file for complete search history.

(56) References Cited

U.S. PATENT DOCUMENTS

| | | | | |
|---|---|---|---|---|
| 7,761,591 | B2 * | 7/2010 | Graham | G06Q 40/02 709/227 |
| 8,112,362 | B2 * | 2/2012 | Abei | G06F 21/105 711/114 |
| 8,639,214 | B1 * | 1/2014 | Fujisaki | G06Q 20/306 455/406 |
| 2002/0107809 | A1 * | 8/2002 | Biddle | G06Q 30/06 705/59 |
| 2002/0138441 | A1 * | 9/2002 | Lopatic | G06F 21/125 705/59 |
| 2003/0009468 | A1 * | 1/2003 | Lamkin | G06Q 40/00 |
| 2005/0076208 | A1 * | 4/2005 | Hori | G06F 21/1076 713/165 |
| 2006/0101269 | A1 * | 5/2006 | Moskowitz | H04K 1/00 713/176 |
| 2011/0178932 | A1 * | 7/2011 | Johnson | G06Q 20/26 705/53 |
| 2013/0185197 | A1 * | 7/2013 | Brown | G06F 21/105 705/39 |
| 2016/0232624 | A1 * | 8/2016 | Goldberg | G06Q 30/08 |
| 2016/0342774 | A1 * | 11/2016 | Henkel-Wallace | H04L 63/107 |
| 2018/0181931 | A1 | 6/2018 | Fujita | |
| 2020/0023273 | A1 | 1/2020 | Tsurusaki et al. | |
| 2020/0226629 | A1 * | 7/2020 | Lawrence | G06Q 30/0206 |
| 2020/0257773 | A1 * | 8/2020 | Sun | G06F 16/2246 |
| 2021/0182871 | A1 | 6/2021 | Zhang et al. | |
| 2021/0342836 | A1 * | 11/2021 | Cella | G06Q 30/0208 |
| 2021/0365909 | A1 | 11/2021 | Shiina | |
| 2021/0382966 | A1 | 12/2021 | Shii et al. | |
| 2022/0100820 | A1 | 3/2022 | Shimizu et al. | |
| 2022/0261934 | A1 * | 8/2022 | Yang | G06Q 40/04 |
| 2023/0173395 | A1 * | 6/2023 | Cella | G06N 3/0455 463/25 |

FOREIGN PATENT DOCUMENTS

| | | | |
|---|---|---|---|
| JP | 6332930 | B2 | 5/2018 |
| JP | 2018-171271 | A | 11/2018 |
| JP | 2021-500811 | A | 1/2021 |
| JP | 2021-189475 | A | 12/2021 |

* cited by examiner

| LICENSE INFORMATION (ITEM ID) | | | |
|---|---|---|---|
| THE NUMBER OF LICENSORS | LICENSOR'S IDENTIFYING INFORMATION | NAME OF THE LICENSOR | RATE |
| 2 | | | |
| | | | |

FIG. 6

| LICENSE INFORMATION | | | |
|---|---|---|---|
| USER ID | NAME INFORMATION | CONTACT INFORMATION | ATTRIBUTE |
| 001 | | | |
| | | | |
| | | | |
| | | | |
| | | | |
| ⋮ | ⋮ | ⋮ | ⋮ |

FIG. 7

DISTRIBUTION MANAGEMENT SYSTEM, SERVER SYSTEM, TERMINAL DEVICE, AND DISTRIBUTION MANAGEMENT METHOD

CROSS REFERENCE TO RELATED APPLICATION

This application is a U.S. national stage application of PCT/JP2023/001485 filed on Jan. 19, 2023, which is based on and claims priority of Japanese patent application JP 2022-053550, filed on Mar. 29, 2022, the contents of which are incorporated herein by reference.

TECHNICAL FIELD

The present invention relates to a distribution management system, a server system, a terminal device, a distribution management method, and the like.

BACKGROUND ART

In recent years, with the development of digital technology and the development of communication technology and networks, it has become common to provide a created object such as a famous character of an animation or a game as a content of a new created object by utilizing SNS (Social Networking Service) or the like.

On the other hand, on networks such as SNS, it is possible to easily utilize such created materials of other persons, and appropriate protection of the created materials is required.

In particular, a system is known in which, when a character used in a game is posted on a network or the like for the purpose of being viewed by a friend or acquaintance, a mark indicating that the content is a creation, such as a "copyright mark (C-mark)", is displayed with the posted content for appropriate content (for example, Japanese Patent No. 6332930).

SUMMARY OF INVENTION

Problem to be Solved by the Invention

However, conventionally, there are many cases where a user independently customizes a character or the like that is creations of others as described above. Also, there are many cases where the customized character or the like are traded between users. The system described in Japanese Patent No. 6332930 cannot appropriately manage the character or the like.

In addition, for example, new products utilizing an original product that is merely changed in color scheme or pose can be easily traded in large quantities with the development of digital technology in recent years, and it is difficult to promote the active utilization of the original product unless appropriate protection is provided.

The present invention can provide an item distribution management system and the like, which can prevent illegal diversion even of an electronic original product which can be easily copied and utilized, and which can protect the rights of the author and promote the active utilization of the original product.

Solution to Problem (1) In a distribution management system according to a first aspect of the invention, there is provided the distribution management system that manages distribution of a derivative product created by a specific user, the derivative product which has uniqueness and in which an original product inheres, the original product being created by an author who is different from the specific user, the system having:

a management section that manages license information that is information of the license of each of the derivative product in which the original product inheres, the license information which relates to the license of each of the original product and which is stored in a storage unit, and user information that is information of a user having a license to utilize each of the derivative product, the user information being for each of the derivative product and being stored in a storage unit;

a transfer detection section for performing a transfer detection process of detecting a transfer of the license for utilizing the derivative product, from a transfer request user that requests the transfer of the derivative product to a transfer destination user who is the user of the transfer destination; and a value setting section that sets a value of the original product that inheres in the derivative product in the case where the license is transferred, based on at least the license information, wherein the management section updates the user information which is for the derivative product of a transfer target, and which is stored in the storage unit, when detecting the transfer of the license from the transfer request user to the transfer destination user.

(2) In a server system according to a second aspect of the invention, there is provided the server system that manages distribution of a derivative product created by a specific user and is connected to a terminal device of the specific user for communication, the derivative product which has uniqueness and in which an original product inheres, the original product being created by an author who is different from the specific user, the system having:

a management section that manages license information that is information of the license of each of the derivative product, the license information which relates to the license of each of the original product and which is stored in a storage unit, and user information that is information of a user having a license to utilize each of the derivative product, the user information being for each of the derivative product and being stored in a storage unit;

a transfer detection section for performing a transfer detection process of detecting a transfer of the license for utilizing the derivative product, from a transfer request user that requests the transfer of the derivative product to a transfer destination user who is the user of the transfer destination; and a value setting section that sets a value of the original product that inheres in the derivative product in the case where the license is transferred, based on at least the license information, wherein the management section performs, every time the transfer is executed, an information distribution management process: of generating block information by blocking the transfer information indicating information of the transfer, the transfer information including at least one of the user information of the derivative product of a transfer target and the license information, with a non-regular value specified based on another transfer information already stored in storage unit; and of storing the generated block information in a plurality of the storage units in a distributed manner.

(3) In a terminal device according to a third aspect of the invention, there is provided the terminal device that manages distribution of a derivative product created by a specific user and is operated by the specific user, the derivative product which has uniqueness and in which an original product inheres, the original product being created by an author who is different from the specific user, the device having:

a management section that manages license information that is information of the license of each of the derivative product, the license information which relates to the license of each of the original product and which is stored in a storage unit, and user information that is information of a user having a license to utilize each of the derivative product, the user information being for each of the derivative product and being stored in a storage unit;

a reception section for receiving an instruction of at least one of: a transfer request user that requests a transfer of the derivative product; and a transfer destination user who is the user of the transfer destination, the instruction of the transfer of the license for utilizing the derivative product, the transfer being executed from the transfer request user to the transfer destination user; and a value setting section that sets a value of the original product that inheres in the derivative product in the case where the license is transferred, based on at least the license information, wherein the management section performs, every time the transfer of the license is executed based on the instruction of the user, an information distribution management process: of generating block information by blocking the transfer information indicating information of the transfer, the transfer information including at least one of the user information of the derivative product of a transfer target and the license information, with a non-regular value specified based on another transfer information already stored in storage unit; and of storing the generated block information in a plurality of the storage units in a distributed manner.

(4) In a distribution management method according to a fourth aspect of the invention, there is provided the distribution management method that executes distribution of a derivative product by using a terminal device which a specific user operates and a sever connected to the terminal device, the derivative product which has uniqueness and in which an original product inheres, the original product being created by an author who is different from the specific user, the method having:

in the server, a process of managing license information that is information of the license of each of the derivative product in which the original product inheres, the license information which relates to the license of each of the original product and which is stored in a storage unit, and user information that is information of a user having a license to utilize each of the derivative product, the user information being for each of the derivative product and being stored in a storage unit;

a transfer detection process of detecting a transfer of the license for utilizing the derivative product, from a transfer request user that requests the transfer of the derivative product to a transfer destination user who is the user of the transfer destination; and a process of setting a value of the original product that inheres in the derivative product in the case where the license is transferred, based on at least the license information, wherein when updating the user information which is for the derivative product of a transfer target, and which is stored in the storage unit, and when detecting the transfer of the license from the transfer request user to the transfer destination user, an instruction of the transfer is received by the terminal device, the instruction is transmitted from terminal device to the server, and information of the transfer from the server is received by the terminal device.

(5) In a distribution management method according to a fifth aspect of the invention, there is provided the distribution management method that executes distribution of a derivative product by using a terminal device which a specific user operates and a sever connected to the terminal device, the derivative product which has uniqueness and in which an original product inheres, the original product being created by an author who is different from the specific user, the method having:

in the server, a process of managing license information that is information of the license of each of the derivative product, the license information which relates to the license of each of the original product and which is stored in a storage unit, and user information that is information of a user having a license to utilize each of the derivative product, the user information being for each of the derivative product and being stored in a storage unit;

a transfer detection process of detecting a transfer of the license for utilizing the derivative product, from a transfer request user that requests the transfer of the derivative product to a transfer destination user who is the user of the transfer destination; and a process of setting a value of the original product that inheres in the derivative product in the case where the license is transferred, based on at least the license information, wherein when performing, every time the transfer is executed, an information distribution management process: of generating block information by blocking the transfer information indicating information of the transfer, the transfer information including at least one of the user information of the derivative product of a transfer target and the license information, with a non-regular value specified based on another transfer information already stored in storage unit; and of storing the generated block information in a plurality of the storage units in a distributed manner, an instruction of the transfer is received by the terminal device, the instruction is transmitted from terminal device to the server, and information of the transfer from the server is received by the terminal device.

(6) In a distribution management method according to a sixth aspect of the invention, there is provided the distribution management method that executes distribution of a derivative product between terminal devices which a specific user operates, the derivative product which has uniqueness and in which an original product inheres, the original product being created by an author who is different from the specific user, the method having:

in each of the terminal devices, a process of managing license information that is information of the license of each of the derivative product, the license information which relates to the license of each of the original product and which is stored in a storage unit, and user information that is information of a user having a license to utilize each of the derivative product, the user information being for each of the derivative product and being stored in a storage unit;

a process of receiving an instruction of at least one of: a transfer request user that requests a transfer of the derivative product; and a transfer destination user who is the user of the transfer destination, the instruction of the transfer of the license for utilizing the derivative product, the transfer being executed from the transfer request user to the transfer destination user; and a process of setting a value of the original product that inheres in the derivative product in the case where the license is transferred, based on at least the license information, wherein when performing, every time the transfer is executed, an information distribution management process: of generating block information by blocking the transfer information indicating information of the transfer, the transfer information including at least one of the user information of the derivative product of a transfer target and the license information, with a non-regular value specified based on another transfer information already stored in storage unit; and of storing the generated block information in a plurality of the storage units in a distributed manner, an instruction of the transfer is received by a first terminal device, the instruction is transmitted from the first terminal device to a second terminal device, and information of the transfer from the second terminal device is received by the first terminal device.

BRIEF DESCRIPTION OF DRAWINGS

FIG. 6 is a diagram illustrating an example of the license information stored in the license information storage unit according to the one embodiment of the present invention.

FIG. 7 is a diagram illustrating an example of user information stored in a user information storage unit in the one embodiment of the present invention.

Figure 1:
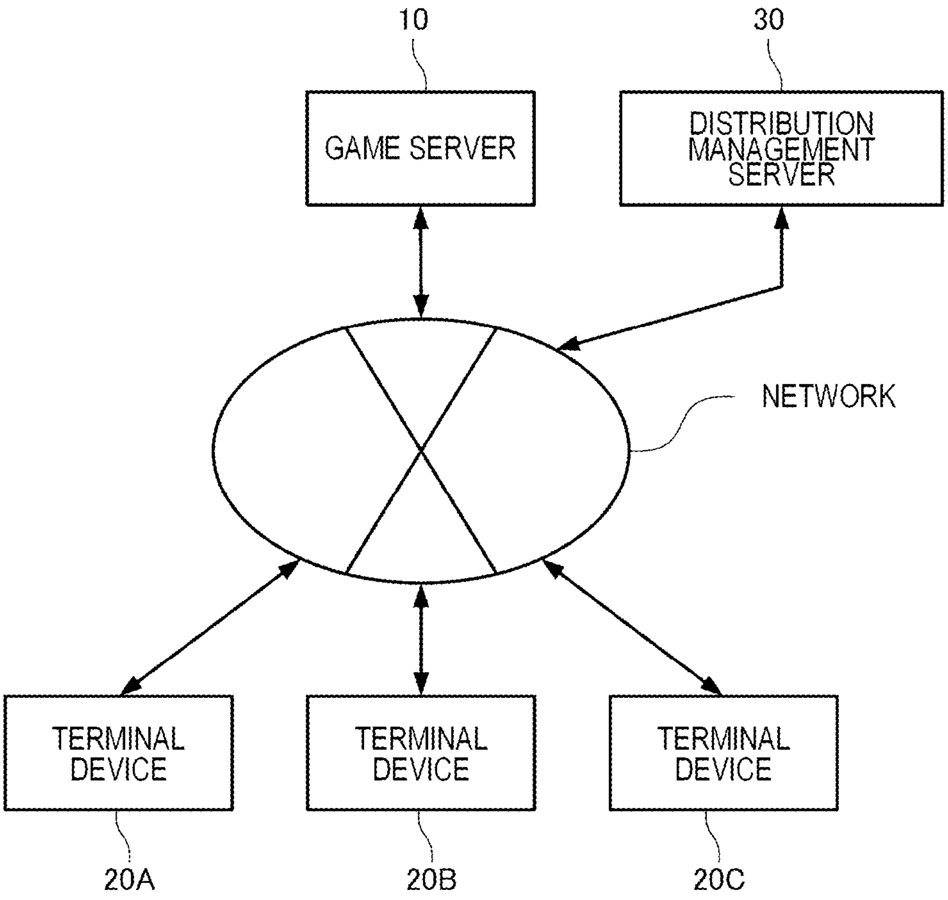
FIG. 1 is an example of a system configuration diagram illustrating a configuration of a game item distribution management system according to one embodiment of the present invention.

DESCRIPTION OF THE EMBODIMENTS (1) According to an embodiment of the present invention, there is provided the distribution management system that manages distribution of a derivative product created by a specific user, the derivative product which has uniqueness and in which an original product inheres, the original product being created by an author who is different from the specific user, the system having:

a management section that manages license information that is information of the license of each of the derivative product in which the original product inheres, the license information which relates to the license of each of the original product and which is stored in a storage unit, and user information that is information of a user having a license to utilize each of the derivative product, the user information being for each of the derivative product and being stored in a storage unit;

a transfer detection section for performing a transfer detection process of detecting a transfer of the license for utilizing the derivative product, from a transfer request user that requests the transfer of the derivative product to a transfer destination user who is the user of the transfer destination; and a value setting section that sets a value of the original product that inheres in the derivative product in the case where the license is transferred, based on at least the license information, wherein the management section updates the user information which is for the derivative product of a transfer target, and which is stored in the storage unit, when detecting the transfer of the license from the transfer request user to the transfer destination user.

Based on this configuration, when a derivative product, which is created by utilizing an original product, which is created by original author different from an author creating the derivative product, such as a customized character by the user, and which is distributed among users, the one embodiment of the present invention can manage the license of the original product (for example, a character) and the user creating the derivative product. Men, the one embodiment of the present invention can track the derivative product of the user even when the derivative product is created by another derivative product.

In other words, when the user creates a new derivative product by utilizing the original product which is created by the original author such as a copyrighted work, the one embodiment of the present invention can perform appropriate management of the license of the original product and the distribution of the derivative product, and can set the value of the original product in accordance with the transfer of the derivative product. Then, the one embodiment of the present invention can also collect a license fee of the original product in accordance with the distribution of the derivative product among the users.

Therefore, the one embodiment of the present invention can protect the rights of the original author who created the original product such as a copyright, and also protect the rights of the original author even when the user creates the derivative product by utilizing an electronic original object that is easily available and that exists in a virtual space such as a game or a network. Thus, the one embodiment of the present invention can promote the active use of the original object.

The "derivative product" basically indicates an electronic product such as a player character used in a virtual space such as a game. The "derivative product" may be an analog product such as a toy or a character good.

For example, the "derivative product" includes:

(A1) a character, such as a player character used in a game, which is customized by coloring, by mounting equipment and by talking on the specific posture; and (A2) a weapon or tool used by a character (it may be a device to be attached to a player character, or a movable body such as a robot or a vehicle for driving);

These include. 1

The "uniqueness" indicates that the original product is unique (original) and ingenious even when utilizing the original product of another author.

The "user information" includes, for example, information for identifying a user at the time of transfer of the original product (hereinafter referred to as "user identification information"), and the transfer history information that indicates the status of the transfer up to the time of the transfer.

For example, the user identification information may include:

(B1) user identification information (i.e., user ID) of each user;

(B2) name information such as the name of the user;

(B3) contact information (hereinafter referred to as "contact information"), and (B4) whether or not the use has a particular attribute (e.g., an attribute of a special member such as a Premier Member) or whether or not the user has such information or the rank or level of the user.

For example, the transfer history information includes:

(C1) the number of the transfers;

(C2) detail of each of the transfers (value of the original product at the time of the transfer, such as the license fee, or the total amount of the license fee);

(C3) the number of the user that uses the original product of the original author (i.e., the number of past users that use the original product of the original author); and (C4) user identification information such as user ID and name information of the past user that uses the original product of the original author.

For example, the detail of each of the transfers includes the type and amount of the original product in the license obtained in the past, the value of the original product such as the amount of the license fee generated by the transfer, the total amount including the value of the original product in the past, and the date and time of the transfer.

For example, the license information is information on the author of the original product, such as a licensor when the derivative product is a copyrighted work.

The license information includes, for example, when the original product is a copyrighted work, the number of licensors, identification information of each licensor and the name thereof, and supplementary information such as the rate for determining the value of the original product (for example, the rates being set differently depending on the utilization form, the utilization period and the like). For example, the number of licensors indicates the number of the authors in the one product that has two or more original products belonging to a different author.

The "license" is basically a right in a state where the original product of the author, such as the copyrighted work, is included and is granted by the author, and is a right that allows the product to be utilized (for example, used and transferred) in a virtual space such as a game and to be utilized (for example, used and transferred) in a real space. Incidentally, the license may further include a right of secondary use such as customization in the product.

The "value of the original product" includes the monetary value, and a "value" other than the amount of money such as an in-game monetary value, points, and energy.

The "setting" in "setting the value of the original product in the derivative product in the case where the license of the original product is transferred" also indicates that the value is calculated by a predetermined calculation formula or the like based on the information of the license, the user information, or both, or that a predetermined amount of money is allocated.

The "when the license is transferred" includes not only the case where the license has already been transferred but also the case where the license is to be transferred (i.e., the case where the value is an estimate).

(2) According to an embodiment of the present invention, there is provided the distribution management system wherein the value setting section sets the value of the original product that inheres in the derivative product in the case where the license is transferred, based on the license information and the user information.

Based on this configuration, the one embodiment of the present invention can set the value of the original product according to the derivative product, such as for each of the derivative products, for each of the licensors who provide the original product, for each of the transfer request user, or for each of destination users, and thus the license can be set according to each situation.

(3) According to an embodiment of the present invention, there is provided the distribution management system wherein the license information includes at least the number of licensors and the information of the rate for determining the value.

Based on this configuration, the one embodiment of the present invention can set the value of the original product included in each of the derivative product corresponding to each derivative product in which the original product is included.

(4) According to an embodiment of the present invention, there is provided the distribution management system wherein the user information includes at least: user identification information that indicates information for identifying the user at the time the transfer is executed, and transfer history information that indicates the past status of the transfer.

Based on this configuration, the one embodiment of the present invention can set the value of the original product included in the derivative product according to the utilization status of the original product by the user or the past transaction status of the derivative product.

(5) According to an embodiment of the present invention, there is provided the distribution management system wherein the transfer history information includes at least one of: the number of transfers; details of the transfer; the user identification information for identifying the transfer destination user; and the number of past users.

Based on this configuration, the one embodiment of the present invention can lower the value of the original product included in the derivative product, or upper the value as it will be exhausted earlier when the number of transfers is large, or upper the value of the original product as it will be premium. Further, the one embodiment of the present invention can lower the value of the original product when the user who transfers from the user who provides the original product and has special membership status.

Since such value can be adjusted based on the situation of the derivative product and the history thereof, the one embodiment of the present invention can set the value corresponding to the utilization situation of the derivative product by the user or the past transaction situation of the derivative product.

(6) According to an embodiment of the present invention, there is provided the distribution management system wherein a reception process section for performing a reception process of receiving a utilization application request of the derivative product created by the user, the utilization application request concerning the utilization of the original product, wherein the management section registers the license information of the derivative product received by the reception process in the storage unit.

Based on this configuration, the one embodiment of the present invention, for example, can start transfer management of the derivative product between the users based on an application of a user who has utilized the original product created by the another. Therefore, the one embodiment of the present invention can reliably perform the collection of a license fee of the original product included in the derivative product associated with the transfer of the derivative product.

(7) According to an embodiment of the present invention, there is provided the distribution management system further having a product detection unit for detecting the original product that is imaged in the derivative product, wherein the management section registers the license information of the derivative product in which the detected original product is imaged in the storage unit.

Based on this configuration, the one embodiment of the present invention can accurately protect the right of the original author of the original product in the derivative product in which the original product of the original is included and is distributed among the users, based on the license information.

(8) According to an embodiment of the present invention, there is provided the distribution management system wherein the management section registers, in the storage unit, the license information of the created derivative product based on original product data, when the derivative product is created based on the original product data in which a specification relating to processing of the original product is defined.

Based on this configuration, since the license information can be registered based on data used for the creation of the derivative product that inheres in the original product, the one embodiment of the present invention can easily register the license information. Further, since it is also possible to process of the license management and of registration of the license information in a lump when the original author provides the data of the original product. Therefore, the one embodiment of the present invention can accurately protect the rights of the original author while reducing the inconvenience of the user regarding the rights of the original product.

The original product, for example, indicates the image data relating to a original product which can be changed in coloring, posture, or wearable equipment, and data that is provided to the user so as to be processable.

(9) According to an embodiment of the present invention, there is provided the distribution management system wherein a payment detection section for performing a payment detection process of detecting that the set value is paid; and a qualified mark control section for performing, when detecting that the value is paid by the payment detection process, at least one of: a process of adding, to the transferred derivative product, a qualified mark indicating that the original product is qualified; and a process of displaying the qualified mark during the utilization of the derivative product.

Based on this configuration, the one embodiment of the present invention can accurately protect the right of the original author of the original product in the derivative product in which the original product of the original is included and is distributed among the users, based on the license information.

The “qualified original product” indicates an original product that is recognized as an authentic product by the original author (for example, an original product that is a copyrighted work).

The “process for adding a qualified mark” indicates a process for adding a qualified mark to a derivative product when the derivative product actually exists in the real world.

For example, the “process for displaying the qualified mark” is a process for displaying a mark indicating that the original product inheres in the derivative product, such as a “copyright mark (C-mark),” when the derivative product is displayed as an image.

(10) According to an embodiment of the present invention, there is provided the distribution management system wherein the derivative product is managed by electronic data on a network.

Based on this configuration, the one embodiment of the present invention can appropriately protect the original author based on the license in the physical derivative product or the electronic derivative product utilizing the original product another creator distributed among the users.

The "derivative product" may be an electronic product or a physical product. However, in the case of a physical product, information about the physical product, such as identification information, is managed on the network utilizing electronic data.

(11) According to an embodiment of the present invention, there is provided the distribution management system wherein a providing section for providing the set value to a given terminal device when the value is set.

Based on this configuration, the one embodiment of the present invention can easily recognize the payment of the license fee, and thus the one embodiment of the present invention can improve convenience of the user.

The "given terminal device" includes, for example, a terminal device of a transfer request user or a destination user.

(12) According to an embodiment of the present invention, there is provided the server system that manages distribution of a derivative product created by a specific user and is connected to a terminal device of the specific user for communication, the derivative product which has uniqueness and in which an original product inheres, the original product being created by an author who is different from the specific user, the system having:

a management section that manages license information that is information of the license of each of the derivative product, the license information which relates to the license of each of the original product and which is stored in a storage unit, and user information that is information of a user having a license to utilize each of the derivative product, the user information being for each of the derivative product and being stored in a storage unit;

a transfer detection section for performing a transfer detection process of detecting a transfer of the license for utilizing the derivative product, from a transfer request user that requests the transfer of the derivative product to a transfer destination user who is the user of the transfer destination; and a value setting section that sets a value of the original product that inheres in the derivative product in the case where the license is transferred, based on at least the license information, wherein the management section performs, every time the transfer is executed, an information distribution management process: of generating block information by blocking the transfer information indicating information of the transfer, the transfer information including at least one of the user information of the derivative product of a transfer target and the license information, with a non-regular value specified based on another transfer information already stored in storage unit; and of storing the generated block information in a plurality of the storage units in a distributed manner.

Based on this configuration, when the user creates a new derivative product by utilizing the original product which is created by the original author, the one embodiment of the present invention can perform appropriate management of the license of the original product and the distribution of the derivative product, and can set the value of the original product in accordance with the transfer of the derivative product. Then, the one embodiment of the present invention can also collect a license fee of the original product in accordance with the distribution of the derivative product among the users.

Therefore, the one embodiment of the present invention can protect the rights of the original author who created the original product, and also protect the rights of the original author even when the user creates the derivative product by utilizing an electronic original object that is easily available and that exists in a virtual space such as a game or a network. Thus, the one embodiment of the present invention can promote the active use of the original object.

The "information distribution management process" indicates a process based on distributed ledger management for distributedly managing block data formed by a plurality of transfer information using, for example, blockchain technology, and is contradictory to process based on centralized ledger management in which data is managed by one server system.

(13) According to an embodiment of the present invention, there is provided the terminal device that manages distribution of a derivative product created by a specific user and is operated by the specific user, the derivative product which has uniqueness and in which an original product inheres, the original product being created by an author who is different from the specific user, the device having:

a management section that manages license information that is information of the license of each of the derivative product, the license information which relates to the license of each of the original product and which is stored in a storage unit, and user information that is information of a user having a license to utilize each of the derivative product, the user information being for each of the derivative product and being stored in a storage unit;

a reception section for receiving an instruction of at least one of: a transfer request user that requests a transfer of the derivative product; and a transfer destination user who is the user of the transfer destination, the instruction of the transfer of the license for utilizing the derivative product, the transfer being executed from the transfer request user to the transfer destination user; and a value setting section that sets a value of the original product that inheres in the derivative product in the case where the license is transferred, based on at least the license information, wherein the management section performs, every time the transfer of the license is executed based on the instruction of the user, an information distribution management process: of generating block information by blocking the transfer information indicating information of the transfer, the transfer information including at least one of the user information of the derivative product of a transfer target and the license information, with a non-regular value specified based on another transfer information already stored in storage unit; and of storing the generated block information in a plurality of the storage units in a distributed manner.

Based on this configuration, when the user creates a new derivative product by utilizing the original product which is created by the original author, the one embodiment of the present invention can perform appropriate management of the license of the original product and the distribution of the derivative product, and can set the value of the original product in accordance with the transfer of the derivative product. Then, the one embodiment of the present invention can also collect a license fee of the original product in accordance with the distribution of the derivative product among the users.

Therefore, the one embodiment of the present invention can protect the rights of the original author who created the original product, and also protect the rights of the original author even when the user creates the derivative product by utilizing an electronic original object that is easily available and that exists in a virtual space such as a game or a network. Thus, the one embodiment of the present invention can promote the active use of the original object.

(14) According to an embodiment of the present invention, there is provided the distribution management method that executes distribution of a derivative product by using a terminal device which a specific user operates and a sever connected to the terminal device, the derivative product which has uniqueness and in which an original product inheres, the original product being created by an author who is different from the specific user, the method having;

in the server, a process of managing license information that is information of the license of each of the derivative product in which the original product inheres, the license information which relates to the license of each of the original product and which is stored in a storage unit, and user information that is information of a user having a license to utilize each of the derivative product, the user information being for each of the derivative product and being stored in a storage unit;

a detection process of detecting a transfer of the license for utilizing the derivative product, from a transfer request user that requests the transfer of the derivative product to a transfer destination user who is the user of the transfer destination; and a process of setting a value of the original product that inheres in the derivative product in the case where the license is transferred, based on at least the license information, wherein when updating the user information which is for the derivative product of a transfer target, and which is stored in the storage unit, and when detecting the transfer of the license from the transfer request user to the transfer destination user, an instruction of the transfer is received by the terminal device, the instruction is transmitted from terminal device to the server, and information of the transfer from the server is received by the terminal device.

Based on this configuration, when the user creates a new derivative product by utilizing the original product which is created by the original author, the one embodiment of the present invention can perform appropriate management of the license of the original product and the distribution of the derivative product, and can set the value of the original product in accordance with the transfer of the derivative product. Then, the one embodiment of the present invention can also collect a license fee of the original product in accordance with the distribution of the derivative product among the users.

Therefore, the one embodiment of the present invention can protect the rights of the original author who created the original product, and also protect the rights of the original author even when the user creates the derivative product by utilizing an electronic original object that is easily available and that exists in a virtual space such as a game or a network. Thus, the one embodiment of the present invention can promote the active use of the original object.

(15) According to an embodiment of the present invention, there is provided the distribution management method that executes distribution of a derivative product by using a terminal device which a specific user operates and a sever connected to the terminal device, the derivative product which has uniqueness and in which an original product inheres, the original product being created by an author who is different from the specific user, the method having:

in the server, a process of managing license information that is information of the license of each of the derivative product in which the original product inheres, the license information which relates to the license of each of the original product and which is stored in a storage unit, and user information that is information of a user having a license to utilize each of the derivative product, the user information being for each of the derivative product and being stored in a storage unit;

a transfer detection process of detecting a transfer of the license for utilizing the derivative product, from a transfer request user that requests the transfer of the derivative product to a transfer destination user who is the user of the transfer destination; and a process of setting a value of the original product that inheres in the derivative product in the case where the license is transferred, based on at least the license information, wherein when performing, every time the transfer is executed, an information distribution management process: of generating block information by blocking the transfer information indicating information of the transfer, the transfer information including at least one of the user information of the derivative product of a transfer target and the license information, with a non-regular value specified based on another transfer information already stored in storage unit; and of storing the generated block information in a plurality of the storage units in a distributed manner, an instruction of the transfer is received by the terminal device, the instruction is transmitted from terminal device to the server, and information of the transfer from the server is received by the terminal device.

Based on this configuration, when the user creates a new derivative product by utilizing the original product which is created by the original author, the one embodiment of the present invention can perform appropriate management of the license of the original product and the distribution of the derivative product, and can set the value of the original product in accordance with the transfer of the derivative product. Then, the one embodiment of the present invention can also collect a license fee of the original product in accordance with the distribution of the derivative product among the users.

Therefore, the one embodiment of the present invention can protect the rights of the original author who created the original product, and also protect the rights of the original author even when the user creates the derivative product by utilizing an electronic original object that is easily available and that exists in a virtual space such as a game or a network. Thus, the one embodiment of the present invention can promote the active use of the original object.

(16) According to an embodiment of the present invention, there is provided the distribution management system wherein the distribution management method that executes distribution of a derivative product between terminal devices which a specific user operates, the derivative product which has uniqueness and in which an original product inheres, the original product being created by an author who is different from the specific user, the method having:

in each of the terminal devices, a process of managing license information that is information of the license of each of the derivative product in which the original product inheres, the license information which relates to the license of each of the original product and which is stored in a storage unit, and user information that is information of a user having a license to utilize each of the derivative product, the user information being for each of the derivative product and being stored in a storage unit;

a process of receiving an instruction of at least one of: a transfer request user that requests a transfer of the derivative product; and a transfer destination user who is the user of the transfer destination, the instruction of the transfer of the license for utilizing the derivative product, the transfer being executed from the transfer request user to the transfer destination user; and a process of setting a value of the original product that inheres in the derivative product in the case where the license is transferred, based on at least the license information, wherein when performing, every time the transfer is executed, an information distribution management process: of generating block information by blocking the transfer information indicating information of the transfer, the transfer information including at least one of the user information of the derivative product of a transfer target and the license information, with a non-regular value specified based on another transfer information already stored in storage unit; and of storing the generated block information in a plurality of the storage units in a distributed manner, an instruction of the transfer is received by a first terminal device, the instruction is transmitted from the first terminal device to a second terminal device, and information of the transfer from the second terminal device is received by the first terminal device.

Based on this configuration, when the user creates a new derivative product by utilizing the original product which is created by the original author, the one embodiment of the present invention can perform appropriate management of the license of the original product and the distribution of the derivative product, and can set the value of the original product in accordance with the transfer of the derivative product. Then, the one embodiment of the present invention can also collect a license fee of the original product in accordance with the distribution of the derivative product among the users.

Therefore, the one embodiment of the present invention can protect the rights of the original author who created the original product, and also protect the rights of the original author even when the user creates the derivative product by utilizing an electronic original object that is easily available and that exists in a virtual space such as a game or a network. Thus, the one embodiment of the present invention can promote the active use of the original object.

Hereinafter, embodiments of the present invention will be described.

Note that the following embodiments do not unduly limit the scope of the invention as stated in the claims. In addition, all of the elements described in connection with the following embodiments should not necessarily be taken as essential requirements of the invention.

In the following embodiments, the "transfer" of an item indicates that the ownership of the item is transferred regardless of whether the item is an electronic item or a physical item. In particular, in the following embodiment, the "transfer" indicates that the right to utilize the item by the user (hereinafter referred to as "right of utilization") is transferred.

[1] Game Item Distribution Management System

First, the outline and configuration of the game item distribution management system 1 in the present embodiment will be described with reference FIG. 1. FIG. 1 is an example of a system configuration diagram illustrating a configuration of a game item distribution management system according to the present embodiment.

As illustrated in FIG. 1, the game item distribution management system 1 of the present embodiment is configured such that: a game server device 10 which provides game services; terminal devices 20 (for example, terminal devices 20A, 20B, and 20C); and a distribution management server device 30 that manages distribution of game items among users, the game items being player characters that are used in games and that are created by users, can be connected to the Internet (an example of a network).

The user (i.e., a player or a viewer) can play the game transmitted from the game server 10 via the Internet by accessing the game server 10 from the terminal device 20.

The user can communicate with other users by accessing the game server 10 from the terminal device 20.

Furthermore, the user can customize (generate) player characters and equipment used in the game as items using the terminal device 20, and can transfer the customized items to other users and acquire the customized items of other users that is requested for transfer under the management of the distribution management server 30.

The game server 10 is an information processing device capable of providing a service for allowing a user to play a game by using a terminal device 20 communicatively connected to the game server 10 via the Internet. The game server 10 may also function as an SNS server that provides communication-type services. The SNS server may be an information processing device that provides a service capable of providing communication among a plurality of users.

The game server 10, for example, when functioning as an SNS server, can provide a game called a social game executed by an operating environment (API (Application Programming Interface), a platform, etc.) of the provided SNS.

The game server 10 may provide a browser game provided on the Web browser of the terminal device 20 or an online game executed by a dedicated platform.

In particular, the game server 10 can provide the browse game (a game that is started only by opening an Web site with a Web browser) written in various languages such as HTML, FLASH (registered trade mark), CGI, PHP, shockwave, Java (registered trade mark) applet, and JavaScript (registered trade mark).

The social games include games that do not require specialized client software and can be used only with the Web browser and a SNS account, unlike existing online games.

When providing the online game, the game server 10 is connected to the terminal device (a smartphone, a personal computer, a game device, etc.) 20 of another user via the network, and has a configuration capable of sharing the progress of the game online.

On the other hand, the game server 10 may be configured by one device (or processor) or a plurality of devices (or processors).

Information such as charging information and game play information stored in a storage area (a storage unit 140 to be described later) of the game server 10 may be stored in a database (a storage device or a memory in the broad sense) connected via the network (an Intranet or the Internet), or information of the player information storage unit 146 stored in the storage area may be stored in a database (a storage device or a memory in a broad sense) connected via a network (an intranet or the Internet) when the game server functions as an SNS server.

Specifically, the game server 10 of the present embodiment receives input information based on an operation of a user of the terminal device 20 (i.e., a player executing a game), and performs a game process based on the received input information. The game server 10 transmits the game processing result to the terminal device 20, and the terminal device 20 performs various processes of providing the game processing result received from the game server 10 so that the user (i.e., player) can view the game processing result.

The terminal device 20 is an information processing device such as a smartphone, a cellular phone, a PHS, a computer, a game device, a PDA, a portable game device, an image generating device, or the like, and is a device connectable to the game server 10 or the distribution management server 30 via the network such as the Internet (WAN) or a LAN.

Note that the communication network between the terminal device 20 and the game server 10 or the distribution management server 30 may be a wired or wireless communication network.

The terminal device 20 has a function of a Web browser capable of browsing Web pages (data in HTML format). That is, the terminal device 20 performs a communication control function for communicating with the game server 10, and performs display control by using data (Web data, data created in the HTML format, or the like) received from the game server 10.

The terminal device 20 has a Web browser function for transmitting data of user's operations to the game server 10, and executes various processes for providing the user with a game screen and a screen related to the play-by-play of the game distributed from the game server 10. The terminal device 20 allows the user to execute a game or to watch play-by-play of the game. Note that the terminal device 20 may acquire the game play information provided from the game server 10, execute a predetermined game process, and execute a game based on the game process.

Specifically, when requesting the game server 10 to play a predetermined game, the terminal device 20 is connected to the game site of the game server 10 and starts the game.

By using on an API as necessary, the terminal device 20 has a configuration to control the game server 10 functioning as an SNS server that performs a predetermined process, or to acquire the player information managed the game server 10, in order to execute a game.

The terminal device 20 customizes (processes) a player character used in the game, equipment to be mounted on the player character, and the like, and transfers the customized items to another user (specifically, the terminal device 20 of another user) via the distribution management server 30.

The distribution management server 30 is an information processing device which performs various processes for managing the transfer of an item between terminal devices 20 communicatively connected via the Internet, such as an NFT (Non-Feasible Token), from a transfer request user who provides item to a transfer destination user who acquires the provided item.

Incidentally, the game server 10 may be configured by one device (or processor) or a plurality of devices (or processors).

The game viewing information stored in a storage area (a storage unit 340 to be described later) of the distribution management server 30 may be stored in a database (a storage device or a memory in the broad sense) connected via the network (an Intranet or the Internet), or the information such as a program for distribution stored in the storage area may be stored in a database (a storage device or a memory in a broad sense) connected via a network (an intranet or the Internet).

[2] Game Server

Figure 2:
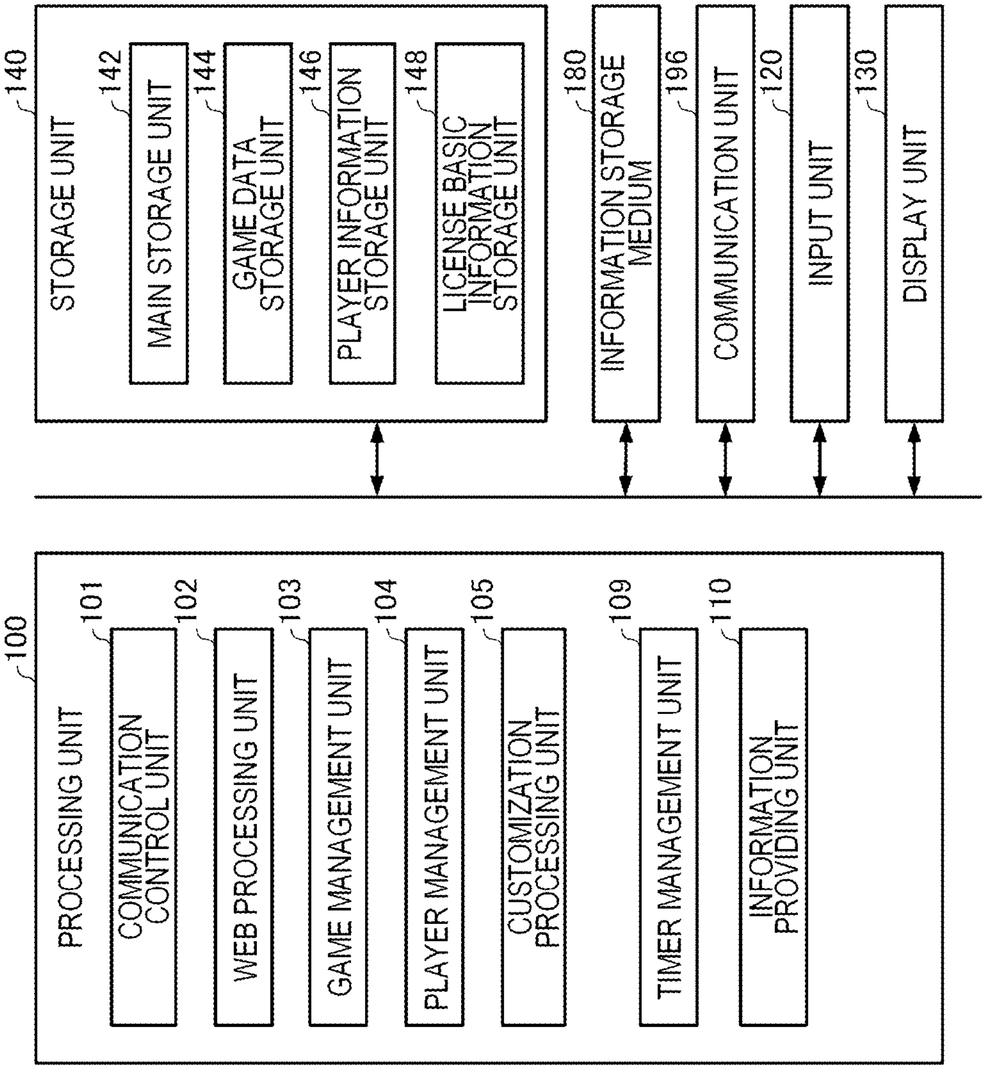
FIG. 2 is an example of a functional block diagram illustrating a game server according to the one embodiment of the present invention.

Next, the game server 10 of the present embodiment will be described with reference to FIG. 2. FIG. 2 is the diagram illustrating a functional block of the game server according to the present embodiment. The game server 10 of the present embodiment may be configured by omitting one or more components shown in FIG. 2.

The game server 10 includes: an input unit 120 used for input by a system administrator and others; a display unit 130 for performing a predetermined display: an information storage medium 180 in which predetermined information is stored; a communication unit 196 for communicating with a terminal device 20 and others; a processing unit 100 for performing processes relating to a game to be mainly provided; and a storage unit 140 for storing various data mainly used for the game.

The input unit 120 is used by a system administrator or the like to input settings related to a game, other necessary settings, and data. For example, the input unit 120 of the present embodiment is configured by a mouse, a keyboard, or the like.

The display unit 130 displays an operation screen for the system administrator. For example, the display 130 of the present embodiment serves as display of the present invention.

In the information storage medium 180 (a computer-readable medium), programs, data, and the like, are stored. The functions of the information storage medium 180 are configured by an optical disc (CD or DVD), magnetic optical disc (MO), magnetic disc, hard disc, magnetic tape, memory (ROM) or the like.

The communication unit 196 performs the various control to communicate with an external device (for example, a terminal device, other servers, or other network systems). The functions of the communication unit 196 can be configured by hardware of various processors or ASICs for communication, program and so on.

The storage unit 140 serves as a work area for the processing unit 100, the communication unit 196, and the like, and its functions are configured by a RAM (VRAM) or the like. The information stored in the storage unit 140 may be managed by a database.

The storage unit 140 of the present embodiment has the main storage unit 142, in addition to:

(A1) a game data storage unit 144 in which information relating to game play during a game commentary is stored, as game play information;

(A2) a player information storage unit 146 in which the player information indicating the information about each of players and the information relating the game of each of the player (hereinafter referred to as "player related information"), are stored; and (A3) the license basic information storage unit 148 in which the basic information (hereinafter referred to as "license basic information") relating the license for each of customizable items, is stored.

In the game data storage unit 144, information of game fields in which games appearing in the game such as player characters are played, condition information used for various determinations, information on objects on the game fields, information for changing the each of the objects, various table information, information on player characters of the players, and information on items used in the game, are stored.

In the player information storage unit 146, for each player, information on various players such as a nickname, a player ID, a score, a level, a charging history, a log-in history, and the like, are stored.

The player information includes a customized item that is used on the game and that is possessed by each player.

In the license basic information storage unit 148, as basic licensing information, identification information, a name, and a rate for determining a value of the licensor of each of the items such as each of the characters, are stored.

The processing unit 100 performs various processes using the main memory 142 in the memory unit 140 as a work area. The processing unit 100 is implemented by hardware such as various processors (CPU, DSP, etc.). ASICs (gate arrays, etc.), and programs.

The processing unit 100 is configured to perform the various processes of the present embodiment or based on programs (data) stored in the information storage medium 180. In the information storage medium 180, a program for causing a computer to function as each of the units of the present embodiment (a program for causing the computer to perform the process of each of the units) is stored.

For example, the processing unit 100 (processor) controls the entire game server 10 based on the program stored in the information storage medium 180, and performs various processes such as control of transfer of data and the like between the respective units. Further, the processing unit 100 performs processes for providing various services in response to requests from the terminal device 20.

The processing unit 100 of the present embodiment includes at least: a communication control unit 101; a Web processing unit 102; a game management unit 103; a player management unit 104; a customization processing unit 105; a timer management unit 109; and an information providing unit 110.

The communication control unit 101 performs the process of transmission and reception of data via a network with the terminal device 20, in other words, the game server 10 performs various processes based on the information received from the terminal device 20 and the like by the communication control unit 101.

The Web processing unit 102 functions as a Web server. For example, the Web processing unit 102 performs the process for transmitting data in response to a request from the Web browser 211 installed in the terminal device 20 and the process for receiving data transmitted by the Web browser 211 of the terminal device 20 through a communication protocol such as HTTP (Hypertext Transfer Protocol).

Note that the game server 10 is described as having a function as an SNS server in the present embodiment. The game server 10 may be formed separately from the game server and the SNS server. The game server 10 may perform a part or all of the process of the game of the present embodiment, or the terminal device 20 may perform a part of the process of the game of the present embodiment.

The game management unit 103, in conjunction with the terminal device 20, and builds a game space as a virtual space, and performs various game processes relating to various competitive games such as a battle game in which a plurality of players fight or battle each other, an action game, an RPG, a sound game, or a sports game based on the operation of the players inputted through the terminal device 20.

The game management unit 103 performs various game processes based on the player's instruction transmitted from the terminal device 20.

The player management unit 104 registers and manages items owned by the player and acquired privileges as player-related information in the player information storage unit 146, and manages a player character set by the player during the game or a deck in which the player character is set.

The customization processing unit 105, in conjunction with the terminal device 20, processes a character used in a game such as a player character or an item such as a component to be mounted on the character, under an instruction of a player, and creates a unique new item in which an original product of an author (for example, a game provider) different from the player of the character inheres.

The customization processing unit 105 registers the created item as player-related information in the player information storage unit 146.

The timer management unit 109 has a timer function and is used to manage the progress status of the game. In particular, the timer management unit 109, in cooperation with the game management unit 103, outputs the current time and a preset time to each unit. The timer management unit 109 is used for synchronization with each terminal device 20.

The information providing unit 110 generates various game control information for the terminal device 20 to process the game and provides the generated information to the terminal device 20.

[3] Terminal Device

Figure 3:
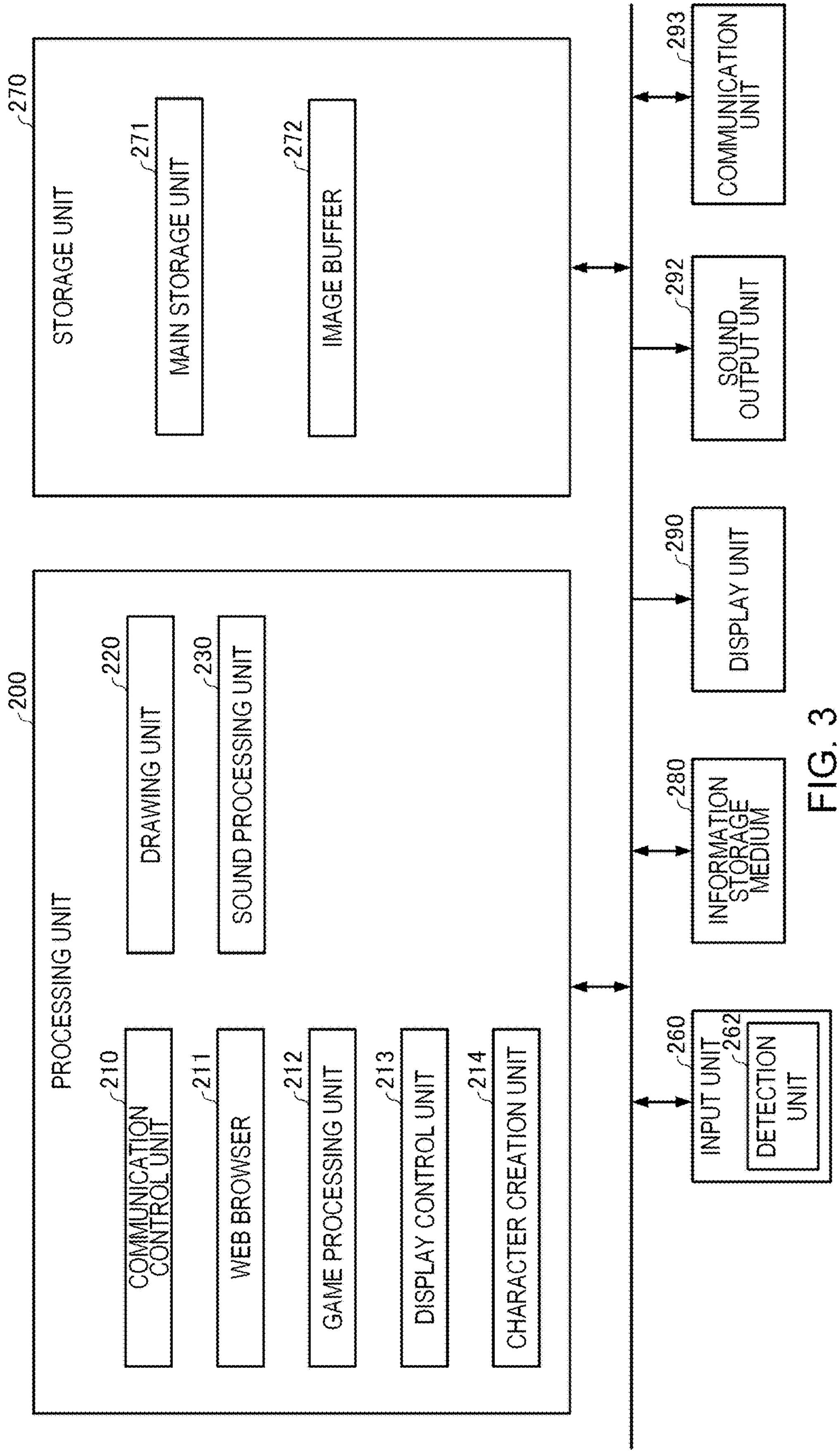
FIG. 3 is an example of a functional block diagram illustrating a terminal device according to the one embodiment of the present invention.

Next, the configuration of the terminal device 20 of the present embodiment will be described with reference to FIG. 3. FIG. 3 is an example of a functional block diagram illustrating a terminal device according to the present embodiment. The terminal device 20 of the present embodiment may be configured by omitting one or more components shown in FIG. 3.

The input unit 260 is a device for inputting input information from the player, and outputs the input information of the player to the processing unit 200. The input unit 260 of the present embodiment includes a detection unit 262 for detecting input information (input signal) of the player. The input unit 260 may be, for example, a lever, a button, a steering wheel, a microphone, a touch panel type display, a keyboard, a mouse, or the like.

The storage unit 270 serves as a work area for the processing unit 200, the communication unit 296, and the like, and its functions are configured by a RAM (VRAM) or the like. The storage unit 270 of the present embodiment includes a main storage unit 271 used as the work area and an image buffer 272 in which a final display image and the like are stored. Note that one or more of these units may be omitted from the configuration.

In the information storage medium 280 (a computer-readable medium), programs, data, and the like, are stored. The functions of the information storage medium 280 are implemented by hardware such as an optical disc (CD or DVD), magnetic optical disc (MO), magnetic disc, hard disc, magnetic tape, or memory (ROM).

The processing unit 200 is configured to perform the various processes of the present embodiment based on programs (data) stored in the information storage medium 280. In the information storage medium 280, a program for causing a computer to function as each unit of the present embodiment (a program for causing the computer to execute the process of each unit) can be stored.

The programs and the game data for making the computer function as the units of the present embodiment that are stored in the information storage medium 180 or memory unit 140 of the game server 10 or the distribution management server 30 may be received via the network, and the received programs and game data are stored in the information storage medium 280. The program or data received from the game server 10 or the distribution management server 30 may be stored in the storage unit 270. The case where the network system is made to run by receiving the program or data in this way is also included in the scope of the present invention.

The display unit 290 displays a given image generated by the present embodiment. The function of the display unit 290 can be implemented by a CRT, a LCD, a touch panel type display, or an HMD (head mounted display) and so on. The sound output unit 292 outputs a sound that is created by the present embodiment. The function of the sound output unit 192 can be implemented by a speaker, a headphone, and the like.

The communication unit 296 performs the various control to communicate with an external device (for example, a terminal device, and saver). The functions of the communication unit 296 can be implemented by hardware of various processors or ASICs for communication, program and so on.

The processor 200 acquires the information relating the game (i.e., the game control information) from the game server 10 via the communication unit 296, and performs the game process, image generation process, sound generation process, and so on based on input data from the game server 10 via (input unit 260).

The processing unit 200, in conjunction with the game server 10, performs a game process for customizing the item (hereinafter referred to as "game items") such as player characters, and a game process for creating new game items (hereinafter referred to as "customized items"). Further, the processing unit 200, in conjunction with the game server 10, performs a game process for registering to the player information storage unit 146 so as to be usable in the game of the player.

The processing unit 200, in conjunction with the distribution management server 30, performs various processes for transferring the customized item already registered in the player information storage unit 146 to another user.

In particular, the processor 200 performs various processes using the main memory 271 in the memory unit 270 as the work area The processing unit 200 is implemented by hardware such as various processors (CPU, DSP, etc.), ASICs (gate arrays, etc.), and programs.

The processing unit 200 includes a communication control unit 210, a Web browser 211, a game processing unit 212, a display control unit 213, a character creation unit 214, a drawing unit 220, and a sound processing unit 230. Note that one or more of these units may be omitted from the configuration.

The communication control unit 210 performs a process for transmitting and receiving data of the game server 10 or the distribution management server 30. The communication control unit 210 performs a process for storing data received from the game server 10 or the distribution management server 30 in the storage unit 270, a process for analyzing the received data, and a control process for other transmission and reception of data.

The communication control unit 210 may store the destination information (IP address and port number) of the server in the information storage medium 280 and perform the management process for the data. The communication control unit 210 may communicate with the game server 10 or the distribution management server 30 when receiving input information for starting communication from the player.

Specifically, the communication control unit 210 transmits the player's identification data and operation data to the game server 10 or the distribution management server 30, and receives data on the game (player data, game card data, player's Web pages, and game screen, etc.) and data relating the game commentary from the game server 10 or the distribution management server 30.

The communication control unit 210 may transmit and receive data to and from the game server 10 or the distribution management server 30 at predetermined intervals, or may transmit and receive data to and from the game server 10 or the distribution management server 30 when receiving input information from the input unit 260. Specifically, the communication control unit 210 of the present embodiment performs the process for receiving a game screen or a screen relating game commentary.

The web browser 211 is an application program for browsing web pages (game screen and the screen of the game commentary), and downloads HTML files, image files, and the like from web servers (the game server 10 or the distribution management server 30), analyzes layouts, and controls the display. The Web browser 211 transmits data to the Web server (the game server 10 or the distribution management server 30) by an input form (a link, a button, a text box, or the like).

The Web browser 211 of the present embodiment can realize a browser game or viewing of a game live. For example, the Web browser 211 may execute a program written in JavaScript (registered trademark), FLASH (registered trademark), Java (registered trademark), or the like received from a Web server (the game server 10 or the distribution management server 30).

The terminal device 20 can display information from the Web server designated by a URL via the Internet by the Web browser 211. For example, the terminals 20 can display the game screen (HTML-data or the like) or the screen of the game commentary received from the game server 10 or the distribution management server 30 by the Web browsers 211.

During viewing the game commentary, the browser 211 provides the distribution management server 30 with information related to the viewer (hereinafter referred to as "viewer-related information", such as the attributes of the user (i.e., viewer) who views the game commentary, and viewer input information, such as comments input by the viewer via the input unit 260.

The game processing unit 212 performs various game calculation processes. For example, the various game calculation processes includes a process of starting a game when a game start condition is satisfied, a process of executing a game, and a process of ending a game when a game end condition is satisfied.

The game processing unit 212 may perform a process for arranging and setting, in an object space, various objects (objects constituted by such primitives as polygons, free-form surfaces, and subdivision surfaces) representing display objects such as a player character, a building, a baseball field, an automobile, a tree, a post, a wall, a map (topography), and the like.

The object space includes both the virtual two-dimensional space and the virtual three-dimensional space. A two-dimensional space is a space where objects are arranged in two-dimensional coordinates (X, Y), and a three-dimensional space is a space where objects are arranged in three-dimensional coordinates (X, Y, Z).

The game processing unit 212 performs a game process including control of transmission and reception of various information at the time of log-in, performing of a game process based on the operation of the player when the game is executed in real time in cooperation with the game server 10, and reproduction of the received automatic calculation data when the game is executed by automatic calculation.

The display control unit 213 performs for displaying the image on the display unit 290. For example, the display control unit 213 may display the image using the Web browser 211.

The character creating unit 214 performs a process for customizing items such as player characters and equipment used in the game and generating new items as customized items in cooperation with the distribution management server 30 or independently based on an instruction from the player (i.e., user).

The drawing unit 220 performs a drawing process based on various processes performed by the processor 200, generates images by drawing process, and outputs the generated image to the display section 213. The image generated by the drawing unit 220 may be a so-called two dimensional image or a so-called three dimensional image.

The sound processing unit 230 performs the sound process based on the results of various processes performed by the processor 200, generates a game sound, such as a BGM, an effect sound, or a voice, and outputs the game sound to the sound output unit 292.

[4] Distribution Management Server

Figure 4:
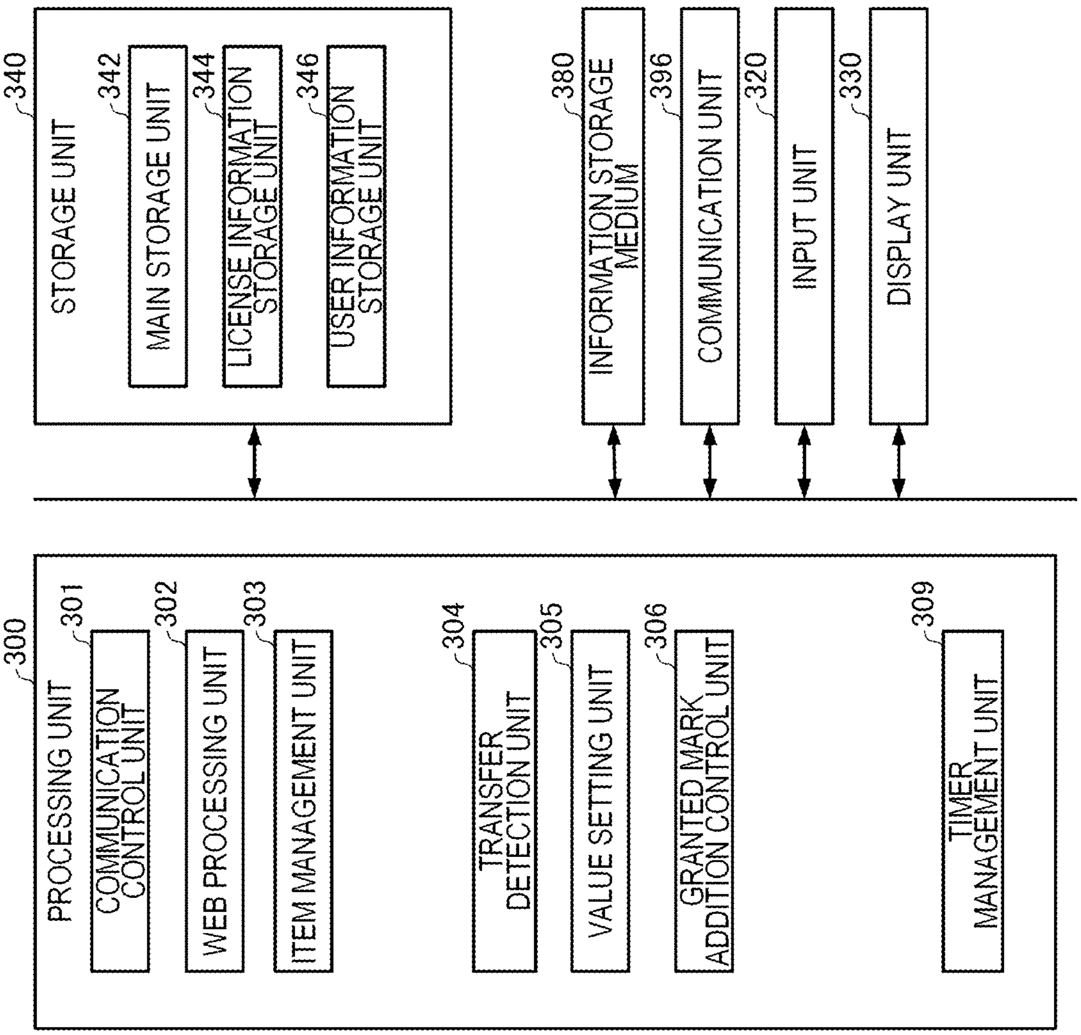
FIG. 4 is an example of a functional block diagram illustrating a distribution management server according to the one embodiment of the present invention.

Next, the distribution management server 30 of the present embodiment will be described with reference to FIG. 4. FIG. 4 is an example of a functional block diagram illustrating the distribution management server 30 of the present embodiment. The distribution management server 30 of the present embodiment may be configured by omitting one or more components shown in FIG. 4.

The distribution management server device 30 includes: an input unit 320 used for input by a system administrator and other persons; a display unit 330 for performing a predetermined display; an information storage medium 380 in which predetermined information is stored; a communication unit 396 for communicating with the terminal device 20 and other devices; a processing unit 300 for performing various processes for managing distribution of a customized item mainly among users; and a storage unit 340 for storing various data used for managing distribution of the customized item mainly among the users.

The input unit 320 is used for setting the distribution of the customized item, other necessary settings, and data input. For example, the input unit 320 of the present embodiment is configured by a mouse, a keyboard, or the like.

The display unit 330 displays an operation screen for the system administrator. For example, the display 330 of the present embodiment serves as a liquid crystal display or the like.

In the information storage medium 380 (a computer-readable medium), programs, data, and the like, are stored. The functions of the information storage medium 180 are configured by an optical disc (CD or DVD), magnetic optical disc (MO), magnetic disc, hard disc, magnetic tape, memory (ROM) or the like.

The communication unit 396 performs the various control to communicate with an external device (for example, a terminal device, other servers, or other network systems). The functions of the communication unit 396 can be configured by hardware of various processors or ASICs for communication, program and so on.

The storage unit 340 serves as a work area for the processing unit 300, the communication unit 396, and the like, and its functions are configured by a RAM (VRAM) or the like. The information stored in the storage unit 340 may be managed by a database.

The storage unit 340 of the present embodiment has the main storage unit 342, in addition to:

(A1) a license information storage unit 344 in which license information such as a license of a customized item is stored; and (A2) a user information storage unit 346 that stores information about a user (i.e., a user and a player) who has a right to use the customized item, such as use of the customized item in the game of the player.

The processing unit 300 performs various processes using the main memory 342 in the memory unit 340 as a work area. The function of the processing unit 300 is implemented by hardware such as various processors (CPU, DSP, etc.), ASICs (gate arrays, etc.), and programs.

The processing unit 300 performs the various processes of the present embodiment based on programs (data) stored in the information storage medium 380, in other words, in the information storage medium 380, a program for causing a computer to function as each unit of the present embodiment (a program for causing the computer to perform the process of each unit) can be stored.

For example, the processing unit 300 (processor) controls the entire distribution management server 30 based on the program stored in an information storage medium 380, and performs various processes such as control of transfer of data and the like between the respective units. Further, the processing unit 300 performs a process for providing various distribution services of game commentary in response to a request from the terminal device 20.

Specifically, the processing unit 300 of the present embodiment includes at least a communication control unit 301, a Web processing unit 302, an item management unit 303, a transfer detection unit 304, a value specification unit 305, a granted mark addition control unit 306, and a timer management unit 309.

The communication control unit 301 performs the process of transmission and reception of data via a network with the terminal device 20, in other words, the distribution management server 30 performs various processes related to distribution of the customized item based on the information received from the terminal device 20 and the like by the communication control unit 301.

The Web processing unit 302 functions as a Web server. For example, the Web processing unit 302 performs the process for transmitting data in response to a request from the Web browser 211 installed in the terminal device 20 and the process for receiving data transmitted by the Web browser 211 of the terminal device 20 through a communication protocol such as HTTP (Hypertext Transfer Protocol).

When a customized item is created, the item management unit 303 registers, in the license information storage unit 344, license information (for example, granted information) related to an original product such as a copyrighted work of another person that inheres in the customized item, and registers, in the user information storage unit 346, information of the created user (i.e., the first user) as user information.

When a customized item is created or when transfer of the customized item from a first user to a second user is detected, the item management unit 303 registers, in the license information storage unit 344, license information relating to the original product of another person that inheres in the customized item, and registers, in the user information storage unit 346, information of the first user (i.e., the first user who is a transfer request user) and the second user (i.e., the destination user) as user information.

The item management unit 303 updates the license information and the user information that have already been registered when detecting the transfer of the already registered customized item from the first user (i.e., the transfer request user) to the second user (i.e., the destination user).

The item management unit 303 manages the customized items that the transfer request user desires to provide (for example, sell), and performs various processes for executing the payment of the consideration when the transaction between the user (the destination user) who desires to be a destination and the transfer request user is established.

The transfer detection unit 304 performs a transfer detection process for detecting transfer of a customized item (i.e., transfer of a license for using the customized item) from the transfer request user who desires to provide to the transfer destination user who is a transfer destination user of the transfer destination.

The value setting unit 305 specifies the value of the original product that inheres in the customized item when the customized item is transferred (i.e., when the license is transferred).

The value setting unit 305 provides (notifies) the specified value to the terminal device 20 of the corresponding user via the communication control unit 301.

The granted mark addition control unit 306 detects that value has been paid for the original product that inheres in the customized items created or transferred.

When it is detected that the value has been paid, the certified mark giving control unit 306 performs at least one of a process for granting the mark indicating that the transferred customized item is a qualified original product and a process for displaying the qualified mark during the utilization of the customized item.

The timer management unit 309 has a timer function, and outputs the current time and a preset time to each unit in cooperation with the game management unit 103. The timer management unit 309 is used for synchronization with each terminal device 20.

[5] Method of the Present Embodiment

[5.1] Overview

Next, the overview of a process (hereinafter referred to as "transfer-related process") related to the transfer of the customized item creating by the user according to the present embodiment, will be described with reference to FIG. 5.

Figure 5:
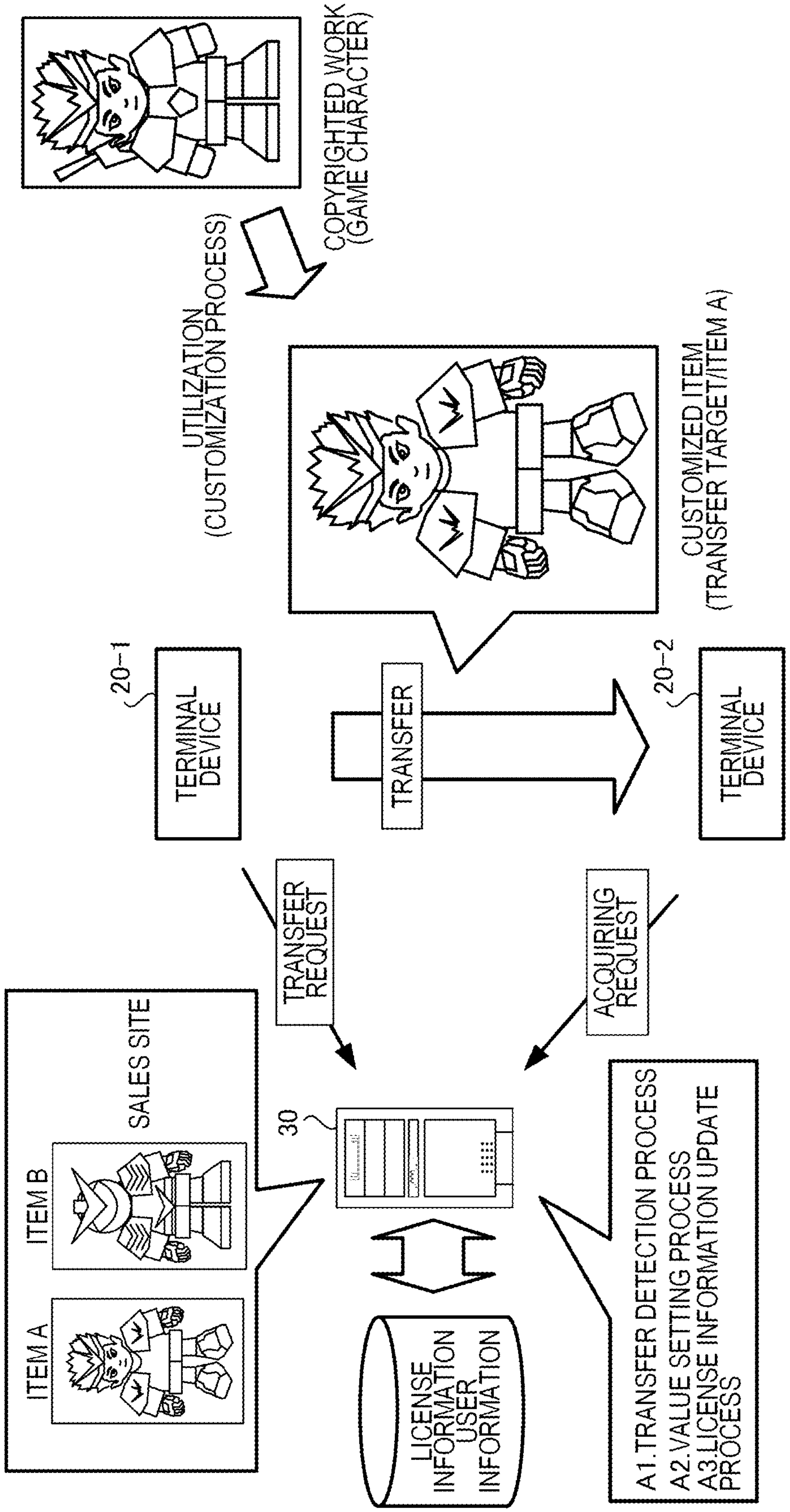
FIG. 5 is a diagram for explaining an overview of a transfer-related process of a customized item generated by a user according to the one embodiment of the present invention.

FIG. 5 is a diagram for explaining an outline of the transfer-related process of the customized item created by the user according to the present embodiment.

The distribution management server 30 of the present embodiment is a server that manages distribution of customized items by users (hereinafter referred to as a "customizer") as derivative products which has uniqueness and in which the original product inheres, the original product being created by user (i.e., the game maker or the creator creating the game) who is different from the customizer.

In other words, the distribution management server 30 of the present embodiment has a configuration used when distributing among users a customized item (product) as an NFT created by using an original product, such as an original player character that is used in a game, and that is customized by the user.

The distribution management server 30 of the present embodiment is configured to manage the license of the utilized original product (i.e., the original player character) used, and to manage the user (hereinafter referred to as "item user") who utilizes the customized item, in which the original product inheres, in a game or the like. Further, the distribution management server 30 is configured to track the transfer of customized items as the original product created by the original author, even when the original product is the customized item.

Specifically, as shown in FIG. 5, the distribution management server 30 of the present embodiment has a configured to manage the license information of an original product that inheres in each customized item, and user information of an item user who utilizes each customized item.

As shown in FIG. 5, the distribution management server 30 has a configured to perform:

(A1) a process (hereinafter referred to as a "transfer detection process") of detecting the transfer of the license of the customized item from the transfer request user that request the transfer of the customized item, to the transfer destination user who is the user of the transfer destination;

(A2) a process (hereinafter referred to as a "value setting process") of setting the value of the original product that inheres in the customized item in the case where the license is transferred; and (A3) a process (hereinafter referred to as a "license information update process") of updating the license information and the user information of the customized item which is a target of the transfer when detecting the license is transferred from the transfer request user to the transfer destination user.

FIG. 5 illustrates an example regarding the item A, in which the original product of a game character (hero) used in the game inheres and which is the customized item created by performing the customization process:

(B1) when a transfer request from the terminal device of the transfer request user is instructed and is registered in the sales site;

(B2) when an acquirement request from the terminal device 20-2 of the transfer destination user is instructed; and (B3) when transferring from the terminal device 20-1 to the terminal device 20-2.

FIG. 5 illustrates an example of a case where the transfer detection process, the value setting process, and the license information update process are performed by the distribution management server 30 in such a case. Although FIG. 5 illustrates that the customized item is transferred from the terminal device 20-1 to the terminal device 20-2, in reality, the distribution management server 30 transfers the item A between the terminal devices 20 of the users virtually, registers and updates the license information and the user information in association with the different users, and reads out the registered information, in order to utilize the customized item by the transfer destination user.

By having such configuration, the distribution management server 30 and the game item distribution management system 1 including the same of the present embodiment can perform appropriate management of the license of the original product and the distribution of the customized item, and can set the value of the customized item in accordance with the transfer of the customized item. Then, the distribution management server 30 and the game item distribution management system 1 can also collect a license fee of the original product in accordance with the distribution of the customized item among the users.

Further, the distribution management server 30 and the game item distribution management system 1 including the same of the present embodiment can protect the rights of the original author who created the original product, and can also protect the rights of the original author even when the user creates the customized item by utilizing an electronic original object that is easily available and that exists in a virtual space such as a game or a network. Thus, the distribution management server 30 and the game item distribution management system 1 can promote the active use of the original object.

In the present embodiment, a customized item used in a game which is electronically generated and distributable is used as an original product.

[5.2] Various Information

[5.2.1] License Information

Next, the license information of the present embodiment will be described using FIG. 6. FIG. 6 is a diagram illustrating an example of the license information stored in the license information storage unit 344 according to the present embodiment.

The license information is information relating to license of an original product that inheres in each customized item, and is stored in the license information storage unit 344 for each customized item.

In particular, the license information is information of the original author of the original product that inheres in the customized item, such as a licensor, and is information that is provided or specified in advance.

For example, the license information includes, as shown in FIG. 6:

(A1) the number of the licensors;

(A2) each of the licensor's identifying information;

(A3) each of the name of the licensor; and (A3) the rate for specifying the value (for example, including the case where different rates are set depending on the utilization form and period, etc.).

The number of the licensors indicates the number of cases where two or more original product inheres and each of the original product belongs to a different author.

When the licensor information includes two or more licensors, the licensor information includes the identification information, name, and rate of the value (hereinafter referred to as the "license fee rate").

[5.2.2] User Information

Next, the user information of the present embodiment will be described with reference to FIG. 7. FIG. 7 is a diagram illustrating an example of user information stored in a user information storage unit 346 in the preset embodiment.

The user information is information of a user who has the license of an original product that inheres in each customized item such as a copyrighted work, and is information for identifying a user (latest user) at the time of transfer of the customized item (hereinafter referred to as "user identification information") and transfer history information which indicates the status of the transfer up to the time of the transfer.

Specifically, the user information functions as a certificate of the license indicating that the utilization of the original product, which inheres in each customized item, is qualified, and is information indicating that the user registered in the current user information is qualified to utilize only the original product, which inheres in the customized item, in the game or the terminal device 20.

In other words, the license is basically a right that is licensed by an original author in a state where an original product of the original author such as a game provider inheres and is a right that can be used (for example, used and transferred) in a virtual space such as a game using a customized item and can be used (for example, used and transferred) in a real space, and the user information is information that defines these.

For example, the user identification information may include:

(A1) user identification information (i.e., user ID) of each user;

(A2) name information such as the name of the user;

(A3) information for a contact (hereinafter referred to as "contact information"); and (A4) whether or not the user has a particular attribute (e.g., an attribute of a special member such as a Premier Member), or whether or not the user has such information or the rank or level of the user.

For example, the transfer history information includes:

(B1) the number of transfers;

(B2) the details of the transfer (the value of the work at the time of the transfer or the total value in the past);

(B3) the number of users (i.e., the number of past users); and (B4) user identification information such as user ID and name information of a past user;

The content of the transfer includes, for example, the type and amount of the product of the right of use obtained in the past, the value of the created thing generated by the transfer, the total amount including the past value, or the date and time of the transfer.

[5.3] Prerequisite Processes for Transfer-Related Actions

[5.3.1] Customization Process

Next, the process of the present embodiment that is a prerequisite for the transfer of the customized item, which is performed by the game server 10, and that creates the customized item, will be described with reference to FIG. 8.

Figure 8:
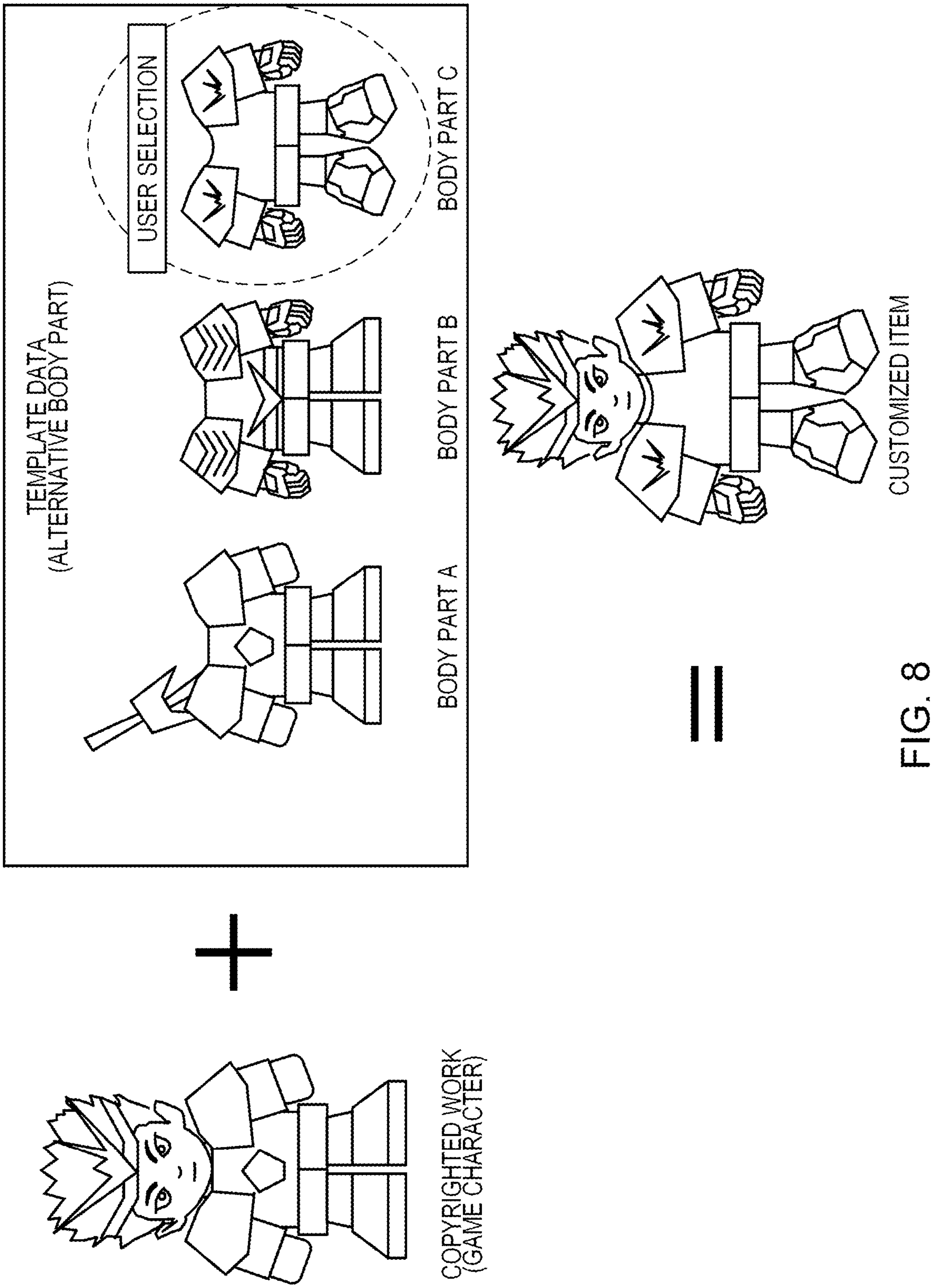
FIG. 8 is a diagram for explaining a customization process performed by the game server of the one embodiment of the present invention.

FIG. 8 is a diagram for explaining a customization process performed by the game server of the present embodiment.

The customization processing unit 105 performs the customization process for processing an item and creating a customized item in cooperation with the terminal device 20.

In particular, the customization processing unit 105 processes an original product as an item such as a character or equipment provided by the game, and creates a unique new item as the customized item.

In other words, in accordance with an instruction of a customizer who is a player, the customization processing unit 105 has a configuration capable of creating the new item as the customized item having uniqueness (original) not existing as other items while utilize the created item created by the original author who is a game provider.

Specifically, the customization processing unit 105 creates, as the customized item:

(A1) a character, such as a player character used in a game, which is customized by the customizer by coloring, wearing equipment, or a specific posture; and (A2) a weapon or tool used by a character (it may be a device to be attached to a player character, or a movable body such as a robot or a vehicle for driving).

In the present embodiment, a method of performing the customization process is not particularly limited, but for example, it is possible to use data of a template for customization provided by a game provider or the like (hereinafter referred to as "template-data").

In other words, in the present embodiment, the customization processing unit 105 may perform the customization process using template-data as an original product data in which specifications relating to processing of the original product, which is utilized by the customized item, such as characters used in the game, are defined.

Specifically, the customization processing unit 105 uses, for each item or for each type of item, for example, as shown in FIG. 8, template data for defining a color scheme, template data in which an alternative part is defined, template data in which a predetermined pose or a predetermined motion (continuous pose) is defined, or template data in which a combination of two or more of these is defined.

In particular, when the operation instruction of the user who desires the customization based on the template data is received, the customization processing unit 105 performs the customization process using the corresponding template data for the corresponding player character.

For example, the template data for defining the color scheme of a player character has data that defines: a range of coloring with one color (an arm part, a corner part, a leg part, or the like); and a selectable color (red, blue, yellow, or the like).

For example, the template data for defining a pose has data that defines: positions based on movable ranges of each parts of the player character, each parts to be replaced; and types of removable equipment and their mounting positions.

FIG. 8 shows an example of the template data when a body part having a sword of a brave man (hereinafter referred to as the "body part A"), and two of the body parts (hereinafter referred to as "the body part B" and "the body part C"), which are different design from each other, are provided regarding the game character of the brave man that is the original product.

FIG. 8 shows the example in which a customized item is finally created in which the body part C is selected for the original product by the user's selection.

As described above, the customization processing unit 105 registers the customized item created in association with the customizer as the player related information in the player information storage unit 146.

When a customized item is newly created, the customization processing unit 105 provides unique identification information (item ID), and newly registers the user ID of the customizer, the license information, and the user information in the license information storage unit 344 and the user information storage unit 346, respectively.

[5.3.2] Transaction Management

Next, the process (hereinafter, referred to as "transaction process") related to a transaction of a customized item performed by the distribution management server 30, the transaction process being attributable for a transfer of the customized item according to the present embodiment, and management thereof (i.e., transaction management), will be described.

The item management unit 303 performs various processes for operating the Web site for performing transactions of customized items between users, such as an EC site, a free market site, or an auction site, in the game or outside the game.

When requesting the transfer of the customized item to another user based on an instruction of each user inputted to the terminal device 20, the item management unit 303 collects various information for trading the customized item between users, such as information on the price for trading (i.e., the selling price) and copyright, generates information for selling the customized item in the site (i.e., information for displaying the information in a viewable manner to other users), and performs a process for displaying the information in a viewable manner to other users in the sales site, in cooperation with the communication control unit 301.

When receiving an instruction of a request to acquire a customized item from another user via the communication control unit 301, the item management unit 303 performs a process relating to a transaction of the customized item from the user who is the transfer request user to the user who is the transfer destination user, such as a process relating to payment of the price and a process relating to transfer of the customized item as electronic.

[5.3] Customized Item Registration Process

Next, a process of registering the customized item as a transfer target (hereinafter referred to as "customized item registration process") performed by the distribution management server 30 of the present embodiment, will be described.

When the customized item is created, the item management unit 303 performs a reception process of receiving a utilization application request relating to the utilization of the original product in the customized item created by the user based on the instruction of the user.

The item management unit 303 registers at least the license information of the customized item in the license information storage unit 344 in association with the created customized item based on the received utilization application request, as described above.

In particular, when the customized item is newly created, the item management unit 303 provides unique identification information (item ID), and newly registers the user ID of the created user, the license information, and the user information in the license information storage unit 344 and the user information storage unit 346, respectively.

Each piece of information included in the newly registered license information is acquired from the game server 10.

For example, as shown in FIG. 6, the licensor information includes;

(A1) the number of licensors;

(A2) each of licensor's identifying information;

(A3) each of the name of the licensor; and (A3) the rate for specifying the value (for example, including the case where different rates are set depending on the utilization form and period, etc.).

Basically, when registering the license information, the item management unit 303 acquires the player information of the user who has applied for the creation and registration of the customized item from the terminal device 20 of the user, and stores the acquired player information as the user information in the user information storage unit 346, as described above.

[5.4] Transfer-Related Process

[5.4.1] Transfer Detection Process

Next, the transfer detection process in the transfer-related process performed by the distribution management server 30 of the present embodiment will be described.

The transfer detecting unit 304 performs the transfer detection process for detecting the transfer of the customized item (specifically, the transfer of the license) from the transfer request user who requests to transfer the customized item created as described above to the transfer destination user who is the user of the transfer destination.

Specifically, the transfer detection unit 304 detects the transfer of a customized item: when the transfer request user (i.e., a first user) requests to transfer to another user; when the second user (i.e., a transfer destination user) requests to acquire the customized item, and when the transfer request user; when the transfer destination user agree to the transfer of the customized item; and when the license of the customized item under the management of the transfer request user is transferred to the transfer destination user.

For example, when the transfer request user puts up a customized item on the transaction site in the game, the transfer detecting unit 304 detects that the transfer request user has requested the transfer of the customized item to another user.

For example, when the transfer destination user requests the purchase of the customized item exhibited by the transfer request user (including the payment for the purchase), the transfer detecting unit 304 detects the purchase of the customized item.

For an example, when the transfer detecting unit 304 detects the completion of the payment of the purchase price or receipt of the payment, and the transmission or the receipt of the electronic data of the customized item to be transferred, the transfer detecting unit 312 detects that the transfer request user and the transfer destination user have agreed to the transfer of the customized item.

As described above, when each condition is satisfied, the transfer detecting unit 304 detects that the customized item has been transferred from the transfer desired user to the transfer destination user.

When the customized item is an item used in a game, the transfer detecting unit 304 stores each piece of information of the customized item in the player information storage unit 146 in association with the transfer destination user, in cooperation with the game server 10.

[5.4.2] Value Setting Process

Next, the value setting process in transfer-related process performed by the distribution management server 30 of the present embodiment will be described.

The value setting unit 305 performs the value setting process of setting the value of the original product that inheres in the customized item when the customized item is transferred as described above (i.e., the transfer of the license of the customized item).

In particular, when the transfer of the customized item is performs (i.e., when the license of the customized item is transferred), the value setting unit 305 reads out the license information and the user information of the customized item from the license information storage unit 344 or the user information storage unit 346.

The value setting unit 305 calculates the value of the original product that inheres in the target customized item by a predetermined calculation formula or the like based on the read license information, the user information, or both.

Specifically, the value setting unit 305 calculates the value of the original product that inheres in the target customized item by using the number of the licensors and the information of the rate for determining the value as the license information.

The value setting unit 305 may calculate the value of the original product which inheres in the target customized item by using the transfer history information that indicates the past transfer status and the transfer status until the transfer occurs as the user information while using the information of the rate for determining the value.

In particular, the value setting unit 305 may calculate the value of the original product that inheres in the target customized item by using the number of times of transfer, the content of transfer (the value of the original product at the time of transfer or the total amount of past values of the original product), the number of users (i.e., the number of past users of the customized item), and the like, as the license information, while using the information of the rate for determining the value.

The content of transfer includes the type and amount of the value of the customized item in the license obtained in the past, the value of the original product generated by the transfer, the total amount including the past value, and the like.

For example, the value setting unit 305 sets the value generated for each transfer to be lower when the number of licensors is large than when the number is small, and sets the value generated for each transfer to be lower when the number of transfers is large than when the number is small. Additionally, when setting a value using the number of transfers, the value specifying unit 360 sets the value so that the value is reduced every time the transfer is repeated.

For example, the value setting unit 305 may set the value of the original product that inheres in the customized item to be low because it is exhausted early when the number of times of transfer is large or the number of users is large, or set the value to be high because it is premium, or set the value to be low when the transfer source user has the status of a special member.

On the other hand, the value setting unit 305 may notify the terminal device 20 of the transfer destination user or the transfer request user of the specified value.

For example, the value setting unit 305 sets the value when detecting that the transfer request user requests to transfer the customized item to another user, that is, when the transfer request user has exhibited the customized item on the transaction site in the game.

In this case, the value setting unit 305 executes control for displaying the set value in the browsing information for allowing other users to browse the exhibited customized item in cooperation with the game server 10 and the transfer detecting unit 304.

When acquiring the browsing information by the Web browser function, the corresponding terminal device 20 displays an image for selling the customized item in which the selling price including the value is clearly demonstrated based on the acquired browsing information.

In this case, when a specific user purchases a customized item under sale and the sales amount is made payment, the item management unit 303 performs a process (e.g., an instruction of settlement process of transfer to an account of the original author at a bank) related to payment to the original author of a part of the payment as a license fee to be appropriated for the right to utilize the original product.

The item management unit 303 may set a value as described above after the transfer detection process is performed, and notify the terminal device 20 of the transfer destination user of the set value.

In this case, the item management unit 303 may perform making payment of the value of the terminal device 20 of the transfer destination user, different from making payment at the time of transfer of the customized item.

Further, in this case, when notifying the terminal device 20 of the transfer destination user of the set value, the value setting unit 305 performs the notification based on the information of the current user stored in the user information.

[5.4.3] Update Process

Next, the update process in the transfer-related process performed by the distribution management server 30 of the present embodiment, will be described.

When detecting that the customized item, which is a transfer target, has been transferred from the transfer request user to the transfer destination user, the item management unit 303 updates the user information stored in the user information storage unit 346 with respect to the customized item.

In particular, the item management unit 303 updates the corresponding user information when the transfer of the customized item, which is the transfer target, to the transfer destination user is completed.

Specifically, the item management unit 303 incorporates each piece of information stored in the user identification information of the user information into the transfer history information, acquires information about the transfer destination user from the corresponding terminal device 20, and rewrites the user identification information to the acquired information about the transfer destination user.

When changing the rate of the license fee of the original product which inheres in the customized item, the item management unit 303 updates the license information of the original product of the corresponding customized item stored in the license information storage unit 344 together with the user information when detecting that the customized item which is the transfer target has been transferred from the transfer request user to the transfer destination user.

[5.5] Qualified Mark Display Control Process

Next, the qualified mark display control process performed by the distribution management server 30 of the present embodiment will be described with reference to FIG. 9.

Figure 9:
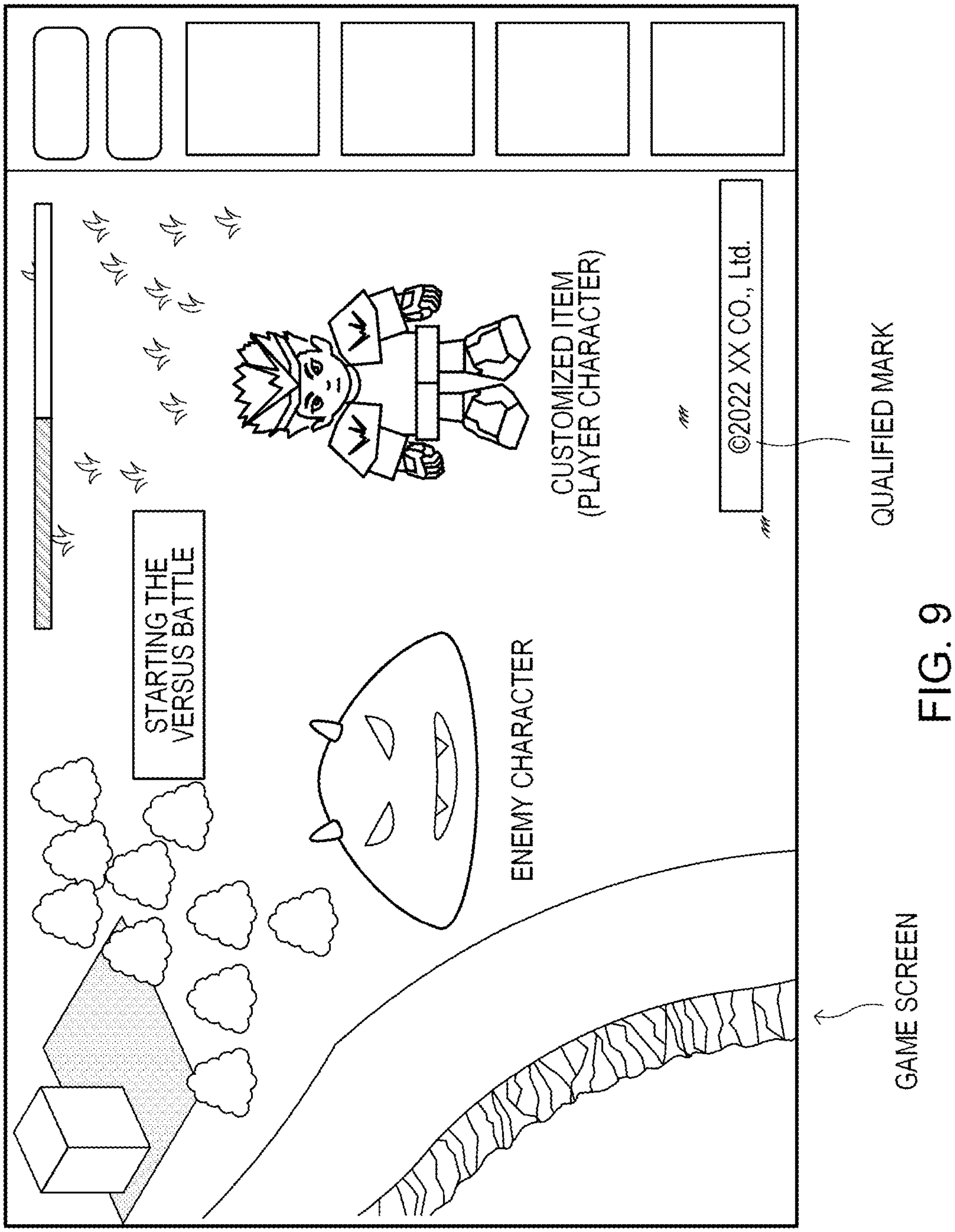
FIG. 9 is a diagram for explaining a qualified mark display control process performed by the distribution management server according to the one embodiment of the present invention.

FIG. 9 is a diagram for explaining the qualified mark display control process performed by the distribution management server 30 according to the present embodiment.

The granted mark addition control unit 306 detects that the value for the original product that inheres in the created or transferred customized item has been paid by the transfer-related processing as described above.

When detecting that the value has been paid, the granted mark addition control unit 306 performs the qualified mark display control process for displaying the qualified mark during use of the customized item.

Specifically, as described above, when detecting that the customized item which is the transfer target has been transferred from the transfer request user to the transfer destination user, the granted mark addition control unit 306 detects that the value of the original product which is inheres in the customized item has been paid.

When detecting that the value for the original product has been paid, the granted mark addition control unit 306 performs the qualified mark display control process to adds control data (hereinafter referred to as "qualified mark display control data") for displaying the qualified mark in the information of the customized item newly registered as the item of the transfer destination user in the game server 10 during use of the customized item.

When displaying a customized item having the qualified mark display control data, the terminal device 20 displays a so-called "copyright mark (C-mark)" indicating the presence of a copyrighted work at a given position on the game screen, as shown in FIG. 9, based on the qualified mark display control data included in the received game control data.

FIG. 9 indicates an example in which the qualified mark "2022 Co., Ltd. XX" is displayed for the customized item.

[5.6] Modified Example

Next, a modified example according to the present embodiment will be described with reference to FIGS. 10 to 12.

Figure 10:
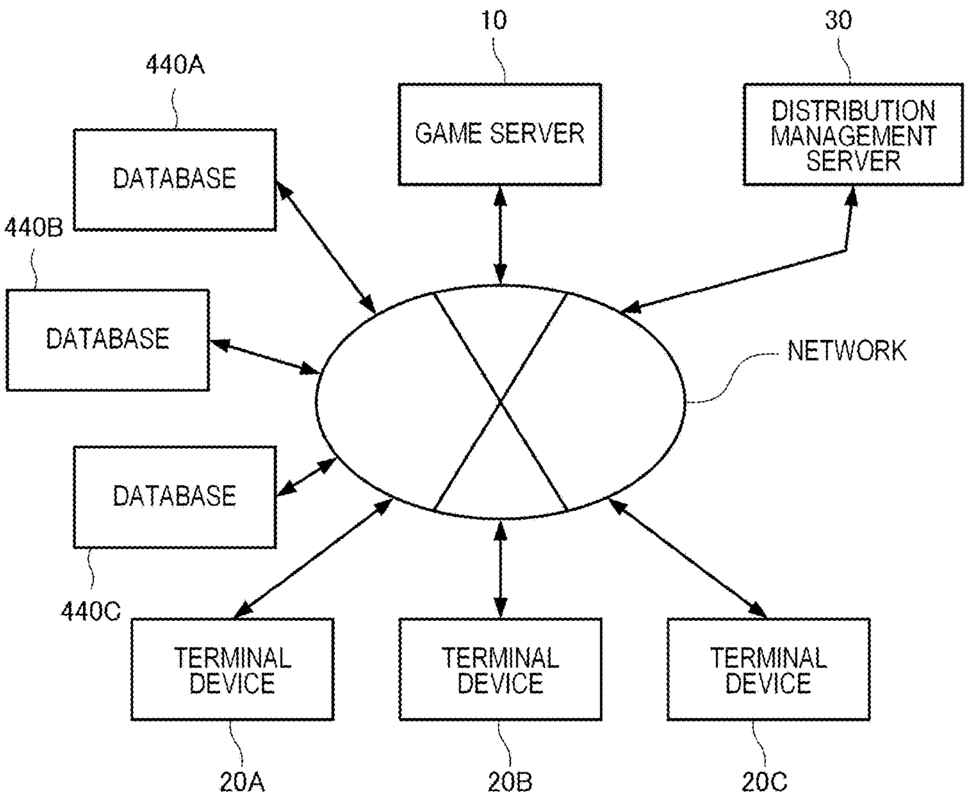
FIG. 10 is an example of a system configuration diagram illustrating a configuration of the game item distribution management system based on a distribution management server of information dispersal management type according to the one embodiment of the present invention.
Figure 11:
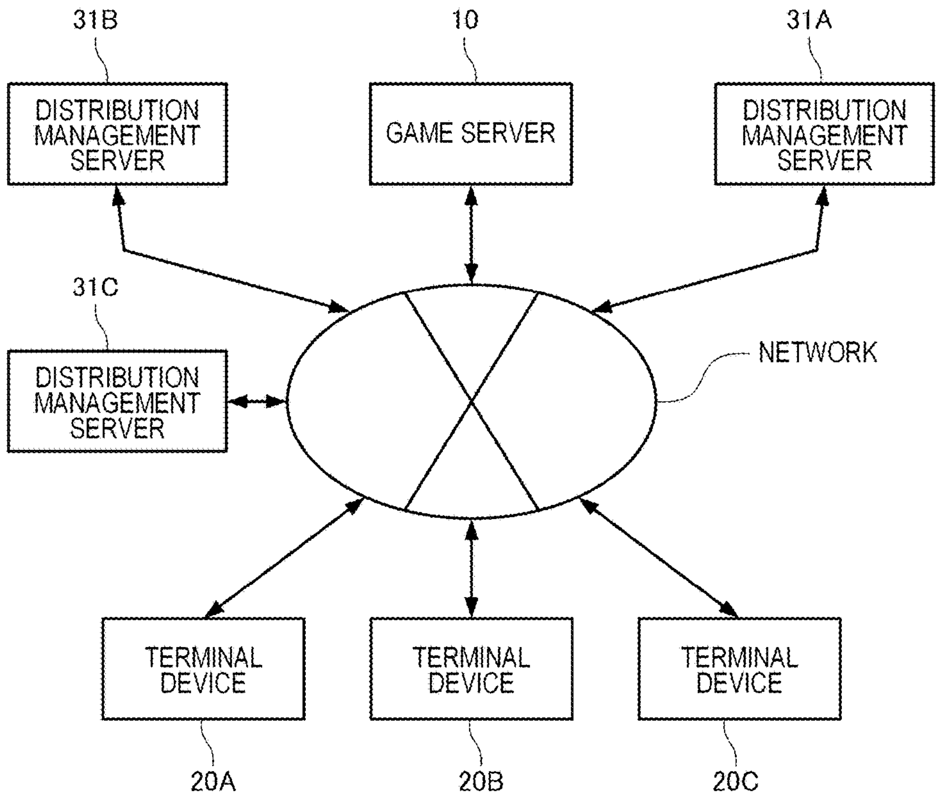
FIG. 11 is an example of a system configuration diagram illustrating a configuration of the game item distribution management system based on a distribution management server of information dispersal management type according to the one embodiment of the present invention.

FIGS. 10 and 11 are examples of a system configuration diagram illustrating a configuration of the game item distribution management system based on a distribution management server 30 of information dispersal management type of the modified example 4. FIG. 12 is an example of a system configuration diagram illustrating a configuration of an information dispersal distribution management network system of the modified example 5.

Modified Example 1: Another Example of Configuration of Server

In the game item distribution management system 1 of the present embodiment, the game server 10 and the distribution management server 30 are provided independently of each other, but may be realized by one server device having the functions of both.

Modified Example 2: the Case where Derivative Product is Analog

Although the present embodiment is described using an electronic customized item as a derivative product, an analog product such as a toy or one of character goods may be applied to the distribution management system.

For example, identification information such as a two dimensional bar code or an identification number is given to an analog product, and distribution management of each of the analog product is performed using the identification information.

Specifically, the item management unit 303 electronically transfers identification information (item ID) added to each of the customized items, and manages distribution of the customized item as an analog product. Additionally, even in this case, the license information and the user information are managed by the distribution management server 30 or the game item distribution management system 1 in the same manner as the electronic items.

On the other hand, in the case where the customized item is an analog product, as the qualified mark display control process, a pasting control process for pasting a physical qualified mark on the customized item by performing an output such as printing may be performed, or an electronic display control process for electronically displaying the qualified mark may be performed.

For example, as the pasting control process, the terminal device 20 is connected to an output device such as a printing device (not shown) by wire or wireless, and causes the output device to print out a qualified mark to be attached to the customized item based on the data provided from the distribution management server 30.

For example, the terminal device 20 performs communication connection with the customized item as an electronic display control process, and provides a qualified mark to be displayed on a display formed in a part of the customized item.

Modified Example 3: Customized Item Registration Process Based on Image Detection In the above embodiment, the registration of the customized item in the distribution among the users is performed based on the request of the user who created the customized item, but the registration of the customized item may be performed by using the image detection process regardless of the request of the user.

In particular, in the distribution process of a customized item configured as an image (for example, when the item is registered on a sales site or transferred), the item management unit 303 detects whether or not the license information, the user information, or both information of the original product, which inheres in the customized item, is registered during the distribution. Further, when determining that the license information or the like is not registered, the item management unit 303 performs registration process for registering the license information and the user information for the corresponding customized item.

Specifically, the item management unit 303 detects the presence or absence of the license information and the user information of the customized item during the distribution process, and specifies the customized item in which the license information and the user information are not registered.

The item management unit 303 compares the image of the specified customized item with the image of the original product registered in advance, and detects the customized item having the same image as the image of the original product or the image regarded as the same.

At this time, the item management unit 303 calculates the difference between the feature amount of each pixel (feature point) constituting the image of the customized item and the feature amount of each pixel constituting the image registered as the original product as the image regarded as the same, and detects that the customized item has the image regarded as the same when the calculated difference is equal to or more than a threshold value.

When detecting that a customized item having the same image as the image of the original product or the image regarded as the same has been registered in advance, the item management unit 303 stores the license information and the user information of the customized item in the license information storage unit 344 or the user information storage unit 346.

For example, the item management unit 303 checks an image of a new customized item posted on a Web site for transactions between the users, and detects the presence or absence of license information and user information of a customized item in the distribution process. Additionally, the item manager 303 may check the image of the customized item during the performing of the transfer-related process.

For example, the item management unit 303 reads out the license information and the user information to be registered from the license information basic storage unit 148 or the player information of the player of the corresponding user, and stores the read license information and the read user information in the license information storage unit 344 or the user information storage unit 346.

Modified Example 4: Information Distribution Management Server

In the above embodiment, the distribution management server of the information dispersal management type may perform a process (hereinafter referred to as "information distribution management process") based on distributed ledger management for distributedly managing data (particularly NFT data) in the ledger by using, for example, a blockchain technology.

That is, as shown in FIG. 10, the present modification is applied to a private game item distribution management system in which a specific manager exists and only a limited number of users, using an information distribution management server of an information dispersal management type (hereinafter referred to as "information dispersal management type distribution management server") 31.

In particular, as shown in FIG. 10, every time the above-mentioned transfer is executed, the information distribution management server device 31 performs an encryption distribution management process: for generating transfer encryption information by encrypting the transfer information indicating information relating to the transfer, the transfer information including at least one of user information and license information of a customized item that is the transfer target based on the other transfer information already stored in a plurality of the databases 440; and for storing the generated transfer encryption information in the plurality of databases 440.

Specifically, each time the user information of one customized item is updated or each time the number of customized items to be managed is increased, the information dispersal management type distribution management server 31:

(A1) encrypts the transfer information of each of the customized items, which is the transfer target, in a given format (a private key of a transfer destination user or the like) and blocks one of more pieces of the encrypted transfer information;

(A2) specifies a non-regular fixed-length value (hereinafter referred to as "previous block specification value") which functions as an ID, such as a hash value calculated by a predetermined operation, from the content of the previous block of the transfer information stored in each database 440, (A3) specifies a value for adjustment (hereinafter also referred to as an "adjustment value") such as a nonce value;

(A4) generates a block using the previous block specification value, the encrypt transfer information block, and the adjustment value;

(A5) stores the generated block in the plurality of databases 440.

The information dispersal management type distribution management server 31 is similar to the distribution management server 30 of the above-described embodiment in the processes other than the record management of the user information and the license information, and therefore, the description thereof will be omitted. Additionally, when reading out the transfer information by transfer-related process and the like, the transfer information is decrypted using the private key of the corresponding user.

In the present modification, as a predetermined timing, a block is generated every time a transfer is executed, every time a new customized item is generated, and every predetermined time (for example, every 10 minutes).

Further, as shown in FIG. 11, the present invention is applicable to a consortium-type game item distribution management system that has a plurality of information dispersal management type distribution management servers 31 and is formed by a plurality of management entities.

Modified Example 5: Information Dispersal Management Distribution Network System In the above embodiment, the system may be formed by a plurality of terminal devices 20, and may be formed by the storage unit 240 formed in each of the terminal devices 20 or a plurality of databases, and may performs the information distribution management process based on the distributed ledger management for distributedly managing the data (particularly the NFT data) by using, for example, the blockchain technology.

Figure 12:
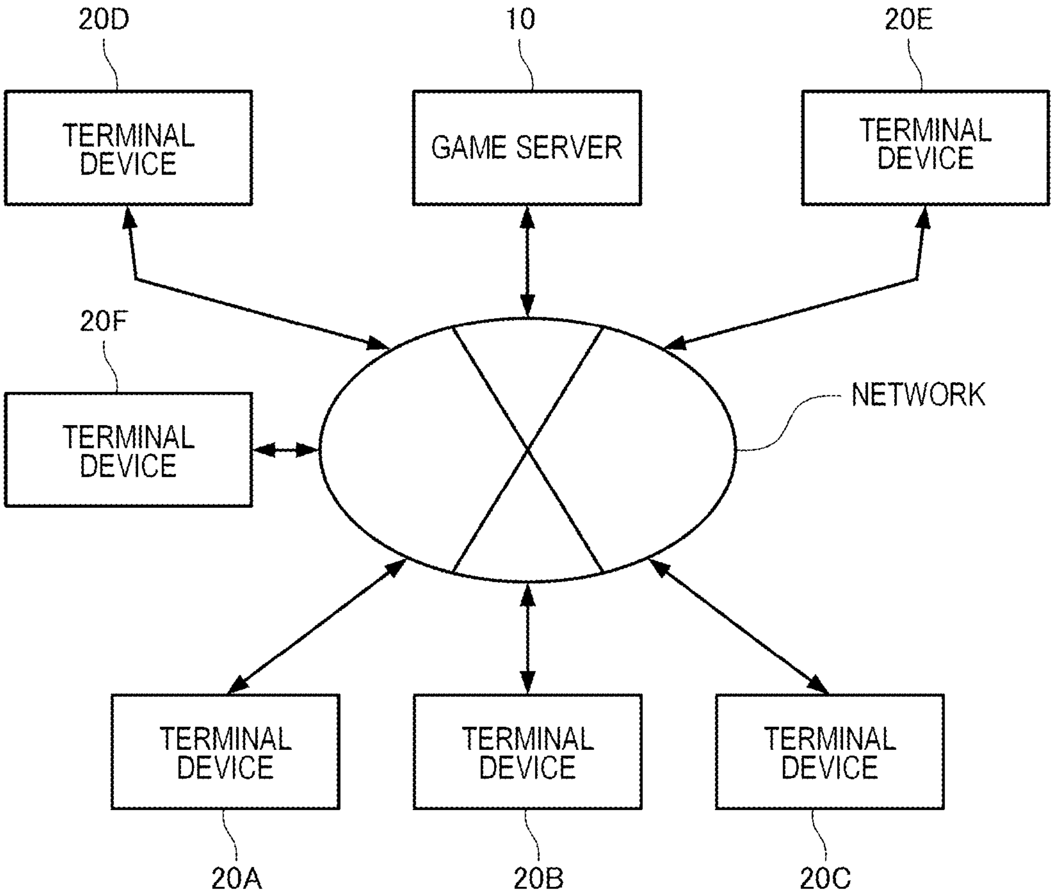
FIG. 12 is another example of a system configuration diagram illustrating a configuration of an information dispersal distribution management network system according to one embodiment of the present invention.

That is, in this modification, as shown in FIG. 12, the information distribution management process may be performed by the terminal device 20 of the transfer request user or the terminal device 20 of the transfer destination user in each of the processes in the above embodiment.

Specifically, each terminal device 20 manages license information that relates to the license of each of the customized items, and that is stored in each of the terminal devices 20, and the user information that relates to each customized item and that is the information stored in each terminal device 20.

Each of the terminal device 20 has a configuration for performing:

(B1) a reception process of receiving an instruction of the transfer request user or the transfer destination user, the instruction being for transferring the right of use for using the customized item from the transfer request user who requests to transfer the customized item to the transfer destination user who is the user of the transfer destination;

(B2) a value setting process of setting the value of the original product that inheres in the customized when the license is transfer based on the request of the user; and (B3) an information distribution management process of generating the block information by blocking the transfer information which has at least one of the user information and the license information of a customized item that is a transfer target, with a non-regular value specified based on another transfer information already stored in storage unit 240, and of storing the generated block information in a plurality of the storage units 240 in a distributed manner.

When the transfer information is read out by transfer-related process or the like, the transfer information is decrypted using the private key of the corresponding user.

In the present modification, each time anew customized item is generated, a block is generated at predetermined time intervals (for example, every 10 minutes).

Modified Example 6: Integral Storage and Management of License Information and User Information In the above embodiment, the license information and the user information are stored in separate storage units, but they may be stored in the storage unit in an integrated manner in association with the item ID.

[6] Operation of Present Embodiment

[6.1] Customized Item Registration Process with Transaction Management

Next, the operation of the customized item registration process including the transaction management performed in the distribution management server 30 of the present embodiment will be described with reference to FIG. 13.

Figure 13:
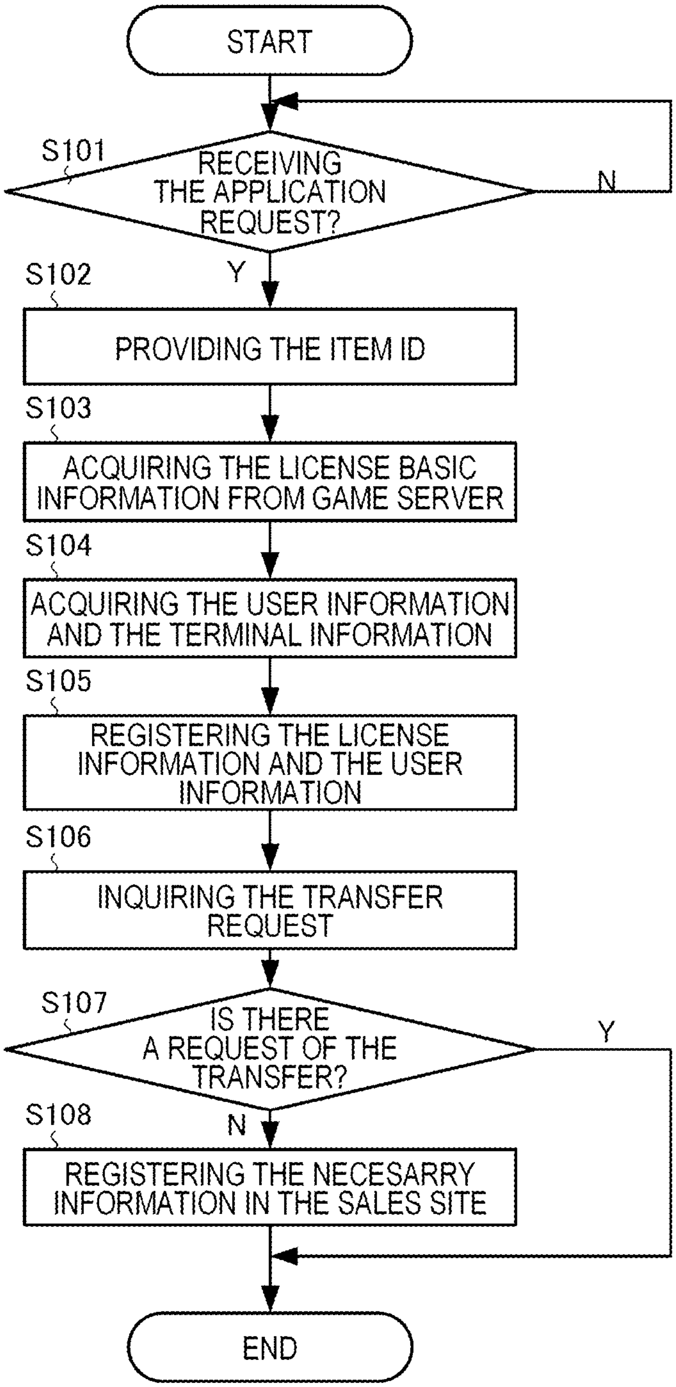
FIG. 13 is a flowchart illustrating an operation of a customized item registration process including transaction management performed in the distribution management server according to one embodiment of the present invention.

FIG. 13 is the flowchart illustrating an operation of a customized item registration process including transaction management performed in the distribution management server 30 of the present embodiment.

In this operation, it is assumed that the customization process has already been performed and the new customized item has been generated.

First, when the item management unit 303 receives a utilization application request for a customized item transmitted from the terminal device 20 via the communication control unit 301 (step S101), provides an item ID to the generated customized item (step S102).

Next, the item management unit 303 acquires license basic information of the original product that inheres in the customized item in cooperation with the game server 10 (step S103).

Next, the item management unit 303 acquires not only the user information but also information of the terminal device 20 (hereinafter referred to as "terminal information"), such as the ID of the terminal device 20, in cooperation with the terminal device 20 (step S104).

Next, the item management unit 303 newly registers the acquired license information and user information in the license information storage unit 344 and the user information storage unit 346, respectively, based on the user ID of the user, while associating the acquired license information and the user information with the provided item ID (step S105).

Next, the item management unit 303, in cooperation with the terminal device 20, requests whether or not the user desires to transfer the customized item to another user (step S106), and determines the result (step S107).

At this time, when it is determined that the user does not desire to transfer the customized item to another user, the item management unit 303 terminates the operation.

On the other hand, when it is determined that the user desires to transfer the customized item to another user, the item management unit 303 performs various processes such as collection of the various information and registration for selling the information in the sales site (i.e., registration of information to be posted so as to be viewable by other users) (step S108), and subsequently ends the operation.

[6.2] Transfer-Related Process

Next, the operation of the transfer-related process performed in the distribution management server 30 of the present embodiment will be described with reference to FIG. 14.

Figure 14:
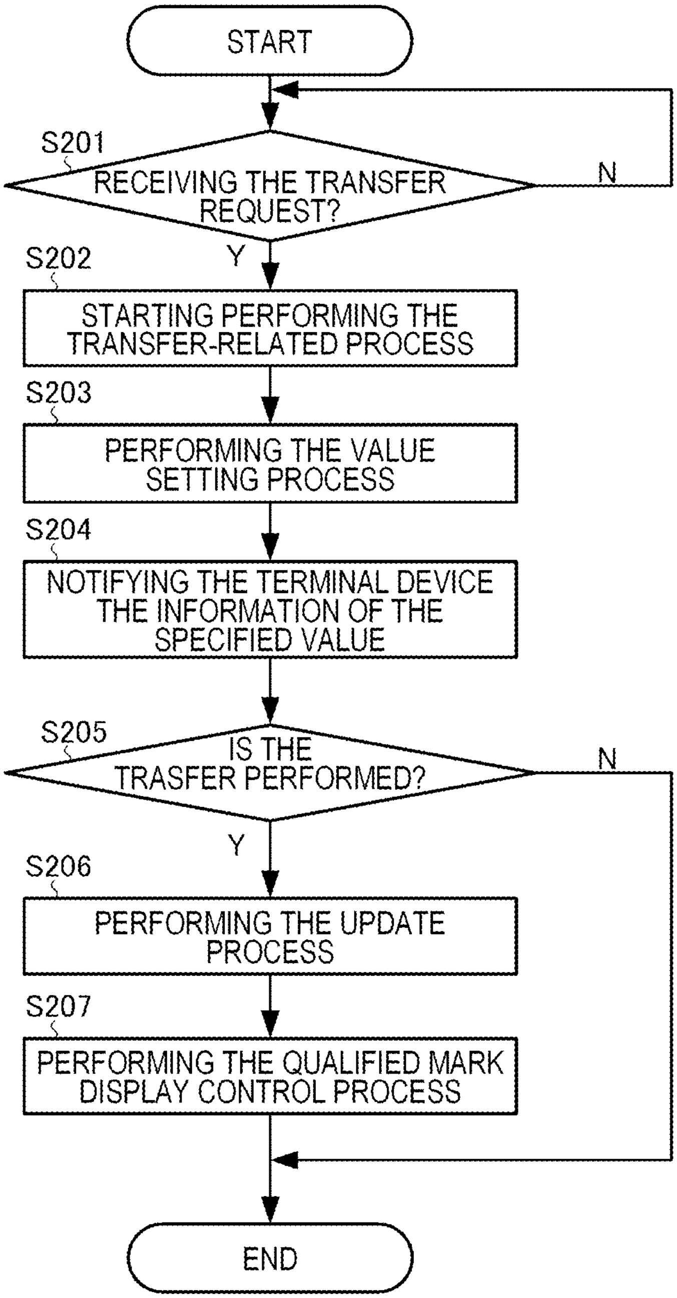
FIG. 14 is a flowchart illustrating an operation of a transfer-related process performed in the distribution management server according to one embodiment of the present invention.

FIG. 14 is the flowchart illustrating the operation of a transfer-related process performed in the distribution management server 30 according to the present embodiment.

In this operation, it is assumed that the customization process has already been performed, and a new customized item has been generated and registered in the sales site.

In this operation, it is assumed that the license information concerning the utilization of the original product by another person has already been registered in the license information storage section 344 for the customized item already registered in the sales site.

First, when receiving a transfer request for a specified customized item transmitted from the terminal device 20 of the transfer destination user via the communication control unit 301 (step S201), the transfer detection unit 304 starts a transfer detection process for detecting the transfer of the corresponding customized item in cooperation with the terminal device 20 of the transfer request user and the terminal device 20 of the transfer destination user (step S202).

Next, the transfer detection unit 304 performs the value setting process of setting the value of the original product that inheres in the customized item that is a transfer target based on the license information and the user information of the customized item (step S203).

Next, the transfer detecting unit 304 notifies the terminal device 20 of the transfer destination user of the information of the specified value (step S204).

Next, the transfer detecting unit 304 performs the transfer detection process of determining whether or not there is a transfer by determining whether or not the purchase intention of the transfer destination user has been received (step S205). That is, the transfer detecting unit 304 detects that the transfer of the customized item is performed by finally receiving the purchase intention of the transfer destination user.

At this time, the transfer detecting unit 304 transmits to the process in the step S206 when it is determined that the transfer has executed, and terminates the present operation when it is determined that the transfer has not executed.

Next, when determining that the transfer has been executed, the item management unit 303 performs the update process of updating the user information stored in the user information storage unit 346 with respect to the target customized item (step S206).

Finally, the granted mark addition control unit 306 performs the qualified mark display control process of adding the qualified mark display control data for displaying the qualified mark during utilization of the customized item, to the information of the customized item registered as the item of the transfer destination user (step S207), and terminates the operation.

In this operation, during execution of the transfer detection process of step 202, the transfer detecting unit 304 may detect whether or not the original product is utilized by image analysis when the license information in the customized item which is a transfer target is not registered. In this case, the transfer detecting unit 304 determines whether or not the customized item which is the transfer target is an item utilizing the original product of another user, and then registers the license information when the customized item which is the transfer target is utilizing the original product.

[7] Other

The present embodiment is not limited to those in the above-described embodiments, and various modifications and variations can be made. For example, words cited as broadly or synonymously in the description or drawings may be replaced by broadly or synonymously in the description or drawings.

In this embodiment, each game may be provided to the terminal device 20 by the single game server 10, or a server system may be constructed by linking a plurality of game server devices 10 to provide each game to the terminal device.

The present embodiment includes substantially the same configuration as the configuration described in the embodiment (for example, configuration with the same function, method and result, or configuration with the same purpose and effect). The present embodiment also includes a configuration in which non-essential parts of the configuration described in the embodiment are replaced. The present embodiment also includes a configuration that achieves the same effects as the configuration described in the embodiment or a configuration that can achieve the same purpose. The embodiment also includes a configuration obtained by adding a known technique to the configuration described in the above embodiment.

Although the present embodiments have been described in detail as described above, it will be readily apparent to those skilled in the art that many variations are possible without departing materially from the new matter and effect of the present invention. Accordingly, all such modifications are intended to be within the scope of the present invention.

REFERENCE SIGNS LIST

1 Game Item Distribution Management System
10 Game Server
20 Terminal Device
30 Distribution Management Server
31 Information Dispersal Management Type Distribution Management Server
100 Processing Unit
101 Communication Control Unit
102 WEB Processing Unit
103 Game Management Unit
104 Player Management Unit
105 Customization Processing Unit
109 Timer Management Unit
110 Information Providing Unit
120 Input Unit
130 Display Unit
140 Storage Unit
142 Main Storage Unit
144 Game Data Storage Unit
146 Player Information Storage Unit
148 License Basic Information Storage Unit
180 Information Storage Medium
196 Communication Unit
200 Processing Unit
210 Communication Control Unit
211 WEB Browser
212 Game Processing Unit
213 Display Control Unit
214 Character Creation Unit
220 Drawing Unit
230 Sound Processing Unit
270 Storage Unit
271 Main Storage Unit
272 Image Buffer
260 Input Unit
262 Detection Unit
280 Information Storage Medium
290 Display Unit
292 Sound Output Unit
296 Communication Unit
300 Processing Unit
301 Communication Control Unit
302 WEB Processing Unit
303 Item Management Unit
304 Transfer Detection Unit
305 Value Setting Unit
306 Granted Mark Addition Control Unit
309 Timer Management Unit
340 Storage Unit
342 Main Storage Unit
344 LICENSE Information Data Unit

346 USER Information Storage Unit
380 Information Storage Medium
396 Communication Unit
320 Input Unit
330 Display Unit
440 Database

The invention claimed is:

1. A distribution management system that manages distribution of a derivative product created by a specific user, the derivative product which has uniqueness and in which an original product inheres, the original product being created by an author who is different from the specific user, comprising one or more processors and one or more memories, the processor programmed to:

manage license information and user information, the license information being information of the license of each of the derivative product in which the original product inheres, and being stored in a storage unit, the user information being information of a user having a license to utilize each of the derivative product, and being for each of the derivative product and being stored in a storage unit;

detect a transfer of the license for utilizing the derivative product, from a transfer request user that requests the transfer of the derivative product to a transfer destination user who is the user of the transfer destination;

set a value of the original product that inheres in the derivative product in the case where the license is transferred, based on at least the license information and;

update the user information which is for the derivative product of a transfer target, and which is stored in the storage unit, when detecting the transfer of the license from the transfer request user to the transfer destination user, wherein the license information includes at least the number of licensors and the information of the rate for determining the value.

2. A distribution management system that manages distribution of a derivative product created by a specific user, the derivative product which has uniqueness and in which an original product inheres, the original product being created by an author who is different from the specific user, comprising one or more processors and one or more memories, the processor programmed to:

manage license information and user information, the license information being information of the license of each of the derivative product in which the original product inheres, and being stored in a storage unit, the user information being information of a user having a license to utilize each of the derivative product, and being for each of the derivative product and being stored in a storage unit;

detect a transfer of the license for utilizing the derivative product, from a transfer request user that requests the transfer of the derivative product to a transfer destination user who is the user of the transfer destination;

set a value of the original product that inheres in the derivative product in the case where the license is transferred, based on at least the license information and;

update the user information which is for the derivative product of a transfer target, and which is stored in the storage unit, when detecting the transfer of the license from the transfer request user to the transfer destination user, wherein the user information includes at least: user identification information that indicates information for identifying the user at the time the transfer is executed, and transfer history information that indicates the past status of the transfer.

3. The distribution management system according to claim 2, wherein the transfer history information includes at least one of: the number of transfers; details of the transfer; the user identification information for identifying the transfer destination user; and the number of past users.

4. A distribution management system that manages distribution of a derivative product created by a specific user, the derivative product which has uniqueness and in which an original product inheres, the original product being created by an author who is different from the specific user, comprising one or more processors and one or more memories, the processor programmed to:

manage license information and user information, the license information being information of the license of each of the derivative product in which the original product inheres, and being stored in a storage unit, the user information being information of a user having a license to utilize each of the derivative product, and being for each of the derivative product and being stored in a storage unit;

detect a transfer of the license for utilizing the derivative product, from a transfer request user that requests the transfer of the derivative product to a transfer destination user who is the user of the transfer destination;

set a value of the original product that inheres in the derivative product in the case where the license is transferred, based on at least the license information;

update the user information which is for the derivative product of a transfer target, and which is stored in the storage unit, when detecting the transfer of the license from the transfer request user to the transfer destination user;

perform a reception process of receiving a utilization application request of the derivative product created by the user, the utilization application request concerning the utilization of the original product; and register the license information of the derivative product received by the reception process in the storage unit.

5. A distribution management system that manages distribution of a derivative product created by a specific user, the derivative product which has uniqueness and in which an original product inheres, the original product being created by an author who is different from the specific user, comprising one or more processors and one or more memories, the processor programmed to:

manage license information and user information, the license information being information of the license of each of the derivative product in which the original product inheres, and being stored in a storage unit, the user information being information of a user having a license to utilize each of the derivative product, and being for each of the derivative product and being stored in a storage unit;

detect a transfer of the license for utilizing the derivative product, from a transfer request user that requests the transfer of the derivative product to a transfer destination user who is the user of the transfer destination;

set a value of the original product that inheres in the derivative product in the case where the license is transferred, based on at least the license information;

update the user information which is for the derivative product of a transfer target, and which is stored in the storage unit, when detecting the transfer of the license from the transfer request user to the transfer destination user; and register, in the storage unit, the license information of the created derivative product based on original product data, when the derivative product is created based on the original product data in which a specification relating to processing of the original product is defined.

6. A distribution management system that manages distribution of a derivative product created by a specific user, the derivative product which has uniqueness and in which an original product inheres, the original product being created by an author who is different from the specific user, comprising one or more processors and one or more memories, the processor programmed to:

manage license information and user information, the license information being information of the license of each of the derivative product in which the original product inheres, and being stored in a storage unit, the user information being information of a user having a license to utilize each of the derivative product, and being for each of the derivative product and being stored in a storage unit;

detect a transfer of the license for utilizing the derivative product, from a transfer request user that requests the transfer of the derivative product to a transfer destination user who is the user of the transfer destination;

set a value of the original product that inheres in the derivative product in the case where the license is transferred, based on at least the license information;

update the user information which is for the derivative product of a transfer target, and which is stored in the storage unit, when detecting the transfer of the license from the transfer request user to the transfer destination user;

perform a payment detection process of detecting that the set value is paid; and perform, when detecting that the value is paid by the payment detection process, at least one of: a process of adding, to the transferred derivative product, a qualified mark indicating that the original product is qualified; and a process of displaying the qualified mark during the utilization of the derivative product.

* * * * *